United States Patent [19]
Shindo et al.

[11] Patent Number: 5,870,635
[45] Date of Patent: Feb. 9, 1999

[54] FOCUS DETECTING APPARATUS OF CAMERA

[75] Inventors: Osamu Shindo; Masahiro Kawasaki, both of Tokyo, Japan

[73] Assignee: Asahi Kogaku Kogyo Kabushiki Kaisha, Tokyo, Japan

[21] Appl. No.: 871,936

[22] Filed: Jun. 10, 1997

Related U.S. Application Data

[63] Continuation of Ser. No. 865,761, Apr. 10, 1992, abandoned, which is a continuation of Ser. No. 382,287, Jul. 20, 1989, abandoned.

[30] Foreign Application Priority Data

Jul. 20, 1988 [JP] Japan ................................. 63-108552
Oct. 6, 1988 [JP] Japan ................................. 63-252827

[51] Int. Cl.$^6$ ............................. G03B 13/36; H04N 3/14
[52] U.S. Cl. ............................. 396/96; 396/121; 348/298
[58] Field of Search ............................. 396/96, 121–123, 396/271; 348/297–299, 229, 230; 356/4.04

[56] References Cited

U.S. PATENT DOCUMENTS

| | | | |
|---|---|---|---|
| 4,283,137 | 8/1981 | Tsunekawa et al. | 354/408 |
| 4,293,207 | 10/1981 | Aoki et al. | 354/402 |
| 4,349,254 | 9/1982 | Jyojiki et al. | 354/406 |
| 4,660,955 | 4/1987 | Ishida et al. | 354/408 |
| 4,684,798 | 8/1987 | Wilwerding . | |
| 4,701,626 | 10/1987 | Ishizaki et al. | 358/213.19 |
| 4,745,427 | 5/1988 | Izumi et al. | 354/432 |
| 4,768,052 | 8/1988 | Hamada et al. | 354/402 |
| 4,841,322 | 6/1989 | Kawasaki . | |
| 4,945,376 | 7/1990 | Kawasaki . | |
| 4,974,007 | 11/1990 | Yoshida | 354/402 |
| 5,017,005 | 5/1991 | Shindo . | |
| 5,327,191 | 7/1994 | Shindo et al. . | |

FOREIGN PATENT DOCUMENTS 2077448 12/1981 United Kingdom .
2196134 4/1988 United Kingdom .

OTHER PUBLICATIONS

Optics and Laser Technology, Oct. 1974, "Self–scanned photo—diode arrays—characteristics and applications" by M.A.Vann.

*Primary Examiner*—W. B. Perkey
*Attorney, Agent, or Firm*—Greenblum & Bernstein, P.L.C.

[57] ABSTRACT

A focus detecting apparatus includes a first object distance measuring zone located above a center portion of the finder field of view, second and third object distance measuring zones located on opposite sides of the center portion of the finder field of view, first, second and third automatic focusing optical systems for converging luminous fluxes of objects to be photographed in first, second and third object distance measuring sensors on which the luminous fluxes of the objects in the first, second and third object distance measuring zones are converged by the associated first, second and third automatic focusing optical systems.

23 Claims, 25 Drawing Sheets

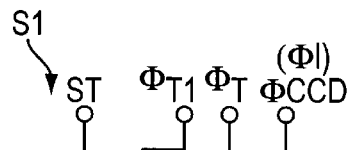
FIG. 12A
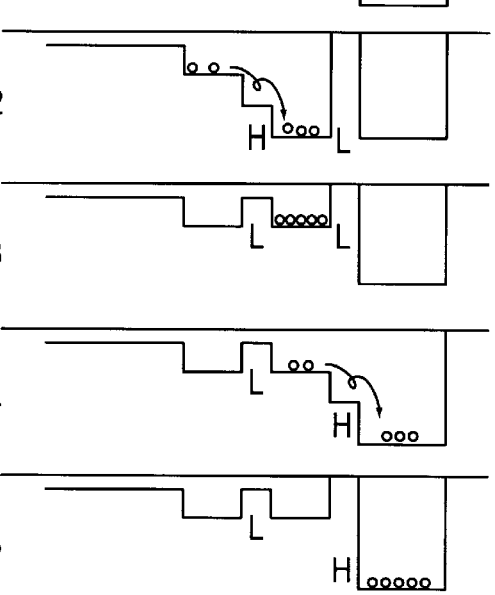
FIG. 12B $t_1$
FIG. 12C $t_2$
FIG. 12D $t_3$
FIG. 12E $t_4$
FIG. 12F $t_5$
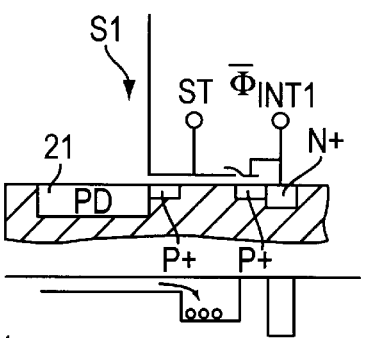
FIG. 13A
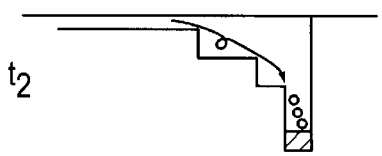
FIG. 13B $t_1$
FIG. 13C $t_2$

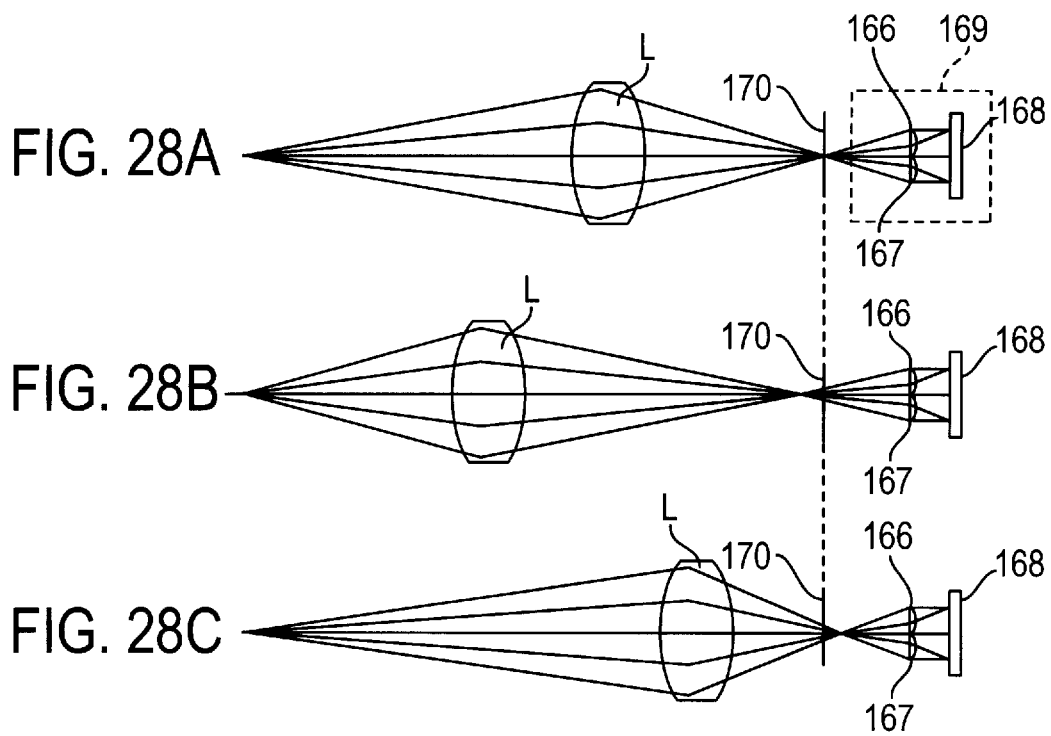
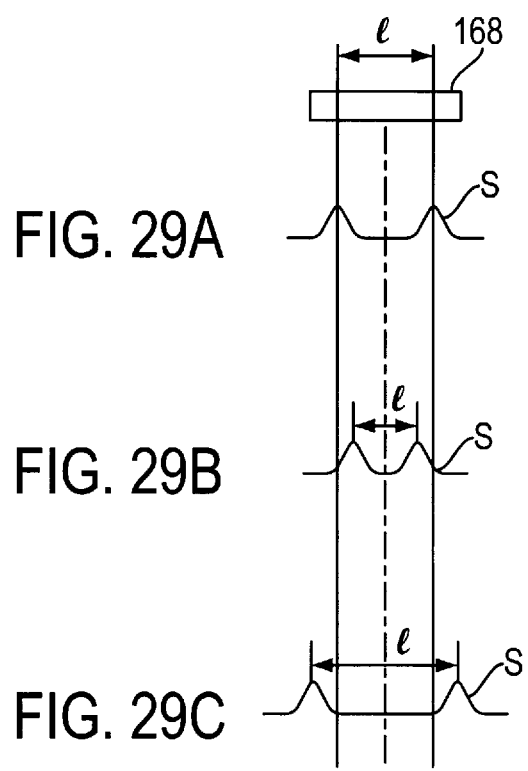

FOCUS DETECTING APPARATUS OF CAMERA

This application is a continuation of application Ser. No. 07/865,761, filed Apr. 10, 1992, now abandoned, which is a continuation of application Ser. No. 07/382,287, filed Jul. 20, 1989, now abandoned.

BACKGROUND OF THE INVENTION

1. Field of the Invention

The present invention relates to a focus detecting apparatus of a camera which has a plurality of object distance measuring zones.

2. Description of Related Art

Recent single-lens reflex cameras usually have an automatic focusing device. A known automatic focusing device in a conventional single-lens reflex camera is a focus detecting apparatus which detects whether beams of light are focused on an object to be photographed and a lens driving device which moves a photographing lens (focusing lens) to a focused position in accordance with the result of the detection of the focus detecting apparatus.

FIG. 25 is a schematic sectional view of a known single-lens reflex camera having a focus detecting apparatus, taken along an optical axis. In FIG. 25, a camera body 1 has an interchangeable lens 2 incorporated therein having a group of photographing lenses which will be referred to as a photographing lens group L hereinafter. An object distance measuring unit 160, which constitutes a focus detecting apparatus, is provided below a main mirror 3 provided in the camera body 1, at a position optically equivalent to a film plane 4. The main mirror 3 has a half mirror portion at its center, so that the beams of light which are transmitted through the photographing lens group L and which are incident on the main mirror 3 are partly transmitted through the half mirror portion thereof.

The beams of light transmitted through the half mirror portion are reflected by an auxiliary mirror 6 and are incident upon the object distance measuring unit 160. Positioned above the object distance measuring unit 160 is a light intercepting plate 211, which intercepts beams of light which are not used to detect the object distance, and an opening 212 through which the beams of light to be used for the detection of the object distance are transmitted.

The beams of light which are reflected by the main mirror 3 are transmitted through a focusing glass 7 and then reflected by a pentagonal prism 9, so that the beams of light are introduced into a finder 8.

The finder 8 has an object distance measuring zone 177 at a center portion of a finder field of view 176, as shown in FIG. 30. The object in the object distance measuring zone 177 is detected to adjust the focus.

As shown in FIG. 26, the object distance measuring unit 160 has a field mask 163, a condenser lens 164, an aperture mask 165, separator lenses 166 and 167 which constitute an image separating optical system to split an aerial image of an object into two images, and a CCD image sensor 168 which constitutes an object distance measuring sensor.

The field mask 163, condenser lens 164, aperture mask 165 and separator lenses 166 and 167 constitute an automatic focusing optical system 169 which, in turn, constitutes a focus detecting optical system together with the CCD image sensor 168.

The field mask 163 of the automatic focusing optical system 169 is provided in the vicinity of a film equivalent plane 170. The film equivalent plane 170 is optically conjugate with the object 162 with respect to the photographing lens group L, so that when the photographing lens group L is located in the focused position, an aerial image 171 of the object 162 in focus is formed on the film equivalent plane 170.

The condenser lens 164 and the aperture mask 165 split the beams of light passing the right and left sides of the photographing lens group L into two luminous fluxes. The separator lenses 166 and 167 are located in a relationship conjugate to the photographing lens group L through the condenser lens 164.

The separator lenses 166 and 167 are usually located side by side in parallel with the length of the film plane, as shown in FIG. 27, so that imaginary opening areas 174 and 175 of an exit pupil of the photographing lens group L mounted to the camera body 1 can be viewed through the measuring zone 172 which is optically conjugate with the center measuring zone 177 (FIG. 30) in the finder field of view 176. The beams of light which are transmitted through the opening areas 174 and 175 are incident upon the seperator lenses 166 and 167, so that two images 171a, 171a of the aerial image 171 formed on the film equivalent plane 170 are reformed on the CCD image sensor 168 by the seperator lenses 166 and 167.

Assuming that the distance between the reformed images 171a and 171a are in focus (FIG. 28(a)), the distance between peak values of image signal S is $l_0$, as shown in FIG. 29(a). When the focal point of the photographing lens group L is located before the in-focus position shown in FIG. 29(a), as shown in FIG. 28(b), the distance is decreased, so that distance $l_1$, between the peak values of the image signal S, is smaller than $l_0$. However, when the focal point of the photographing lens group L is located behind the in-focus position shown in FIG. 28(a), the distance is increased, so that distance $l_2$, between the peak values of the image signal S, is larger than $l_0$, as shown in FIG. 28(c).

The change of the image distance is substantially proportional to the amount of defocus of the photographing lens group L and Accordingly, in a conventional single-lens reflex camera, the distance of the images formed on the CCD image sensor 168 is detected to arithmetically process the same in order to determine the direction and amount of defocus of the photographing lens group L, thereby moving the photographing lens group L to the focused position (in-focus position).

As can be seen in FIG. 30, for example, when a photographer has determined a composition so that the desired object 162 is located in the center measuring (focusing) zone 177 of the finder field of view 176, a focusing lens of the photographing lens group L is moved to the focused position by a focusing lens driving motor (not shown) and a focusing lens driving mechanism (not shown), where an in-focus picture can be taken.

In the focus detecting device mentioned above, since the measuring zone 177 is located in the center area of the finder field of view 176, the photographing lens is focused on the object 162.

However, a case exists where a desired object should be located in the circumferential area, rather than the center area of the finder field of view.

Furthermore, there is also a case where two human figures can not be placed in the center area of the finder field of view 176, namely in the measuring zone 177.

To this end, a conventional camera has a so-called focus lock device in which the focusing is effected while the object is placed in the center measuring zone 177 of the finder field of view 176, and then the focus is locked. In this state, when a desired framing is effected, a picture in which the desired object is placed in the circumferential area and the camera is focused on the object 162, as shown in FIG. 31 can be taken.

However, in the conventional focus detecting device, the focusing is effected (by moving the photographing lens) once the object is placed in the center of the finder field of view 176, and the focus is locked to fix the photographing lens group L. After that, the composition is redetermined and the releasing is effected. Due to these troublesome operations, it takes a great deal of time to take a picture.

To this end, there is also known a multi-focus detecting apparatus in which two circumferential measuring zones 177a and 177b are provided to surround the measuring zone 177 of the finder field of view 176, so that whether or not the camera is focusd on the object placed on the circumferential zones 177a and 177b is also detected, as can be seen in FIG. 30.

Such a multi-focus detecting apparatus usually has a first center automatic focusing optical system 169, a pair of second and third automatic focusing optical systems 211 and 212, and first, second and third CCD image sensors 168, 241 and 242, as shown in FIG. 32.

The first automatic focusing optical system 169 has a condenser lens portion 222 and a separator lens portion 232. The second automatic focusing optical system 211 has a condenser lens portion 221 and a separator lens portion 231. The third automatic focusing optical system 212 has a condenser lens portion 223 and a separator lens portion 233.

Numerals 177', 177a', 177b' designate fields of view of the center measuring area and the circumferential measuring areas of the first, second, and third automatic focusing optical systems 169, 211 and 212 and are substantially conjugate with the measuring zones 177, 177a and 177b of the finder field of view 176, respectively. The CCD image sensors 168, 241 and 242 are formed on the same integrated circuit board 251.

Upon taking a picture of a human figure, a photographer usually unconsciously looks at the persons face through the finder. This is because the face reflects a state of mind of human being. Usually, the face of a human figure in a portrait is located slightly above the center of the finder field of view rather than the center.

However, in the conventional focus detecting apparatuses, the center measuring zone 177 is provided at the center of the finder field of view 176. As a result, upon taking a picture of a human figure, the center measuring zone 177 does not often correspond to the face of the human figure, as shown in FIG. 30. Therefore, after the center of the finder field of view 176 is located to correspond to the face, the focusing is effected and locked. After that, the framing is effected (FIG. 30). Therefore, a photographer tends to concentrate his or her attention to agreement of the face of the human figure with the measuring zone 177 and miss a chance of taking a picture that shows a change of expression.

Furthermore, in the conventional multi-focus detecting apparatus, since three CCD image sensors 168, 241 and 242 are arranged in the form of a generally H-shape, as shown in FIG. 33, it is necessary to bend a single transfer register 252 which reads data of the three image sensors 168, 241 and 242, as shown in FIG. 33, resulting in an increased transfer distance.

The quantity of charge accumulated by the CCD sensors 168, 241 and 242 depends on the intensity (brightness) of the luminous flux of the object. It is also known to provide a monitor sensor 168m in the vicinity of the center CCD image sensor 168 to detect the amount of light incident thereon, to control the integration time (time of accumulation of the charges).

In the known detecting mechanisms mentioned above, in which the integration time is controlled by a mean value of the brightnesses detected by the measuring zones 177, 177a and 177b, or by the brightness of the center measuring zone 177, if there is a large difference in brightness between the measuring zones 177, 177a and 177b, the quantity of charge accumulated in the CCD image sensor corresponding to the measuring zone having a high brightness exceeds a saturation value, so that detection can not be effected, or a sufficient charge can not be accumulated in the CCD image sensor corresponding to the measuring zone having a low brightness, so that the detection can not be effected.

The CCD image sensor used in a conventional focus detecting apparatus, as mentioned above, has a light receiver having an array of photoelectric converting elements, an integral portion which integrates the signal charge converted by the light receiver, and a charge transfer portion which reads the integrated signal charge. The signal charge integrated by the integral portion is transferred to the charge transfer portion, and is then successively transferred from the charge transfer portion by at least a two-phase transfer of transfer pulses which are generated at a constant interval. These transfer pulses are usually outputted periodically, so that the signal charge is transferred during the period of outputting.

No accumulated control pulse is output during the period of outputting of the transfer pulses to prevent the signal charge from being transferred from the integral portion to the charge transfer portion. This is because if the accumulated control pulse is output when the charge transfer portion has an electic charge therein, the signal charge is mixed with the accumulated control pulse in the charge transfer portion, so that the signal no longer functions as a data signal.

To avoid this, even if the brightness of an object is high, so that the integral portion is saturated, the integral operation cannot be completed until the output time of the transfer pulse ends. As a result, when the brightness of an object is high, no precise focus detection can be effected.

To solve the problem mentioned above, it is known to make the prohibition period of outputting the accumulated control pulse variable (e.g. Japanese Unexamined Patent Publication No.60-121409). However, such a varying means makes the circuit construction and the control operation thereof complex.

SUMMARY OF THE INVENTION

The primary object of the present invention is to eliminate the above-mentioned drawbacks by providing a focus detecting apparatus in which a point of view of a photographer coincides with the measuring zones.

Another object of the present invention is to provide a focus detecting apparatus in which a distance of transfer of signal charges can be decreased.

Still another object of the present invention is to provide a focus detecting apparatus in which accurate object distance-signals can be obtained for every measuring zone.

To achieve the objects mentioned above, according to the present invention, the improvement is directed to measuring zones which are located in the finder field of view above the center portion thereof.

With this arrangement, the face of a human figure is placed in the measuring zones in a normal composition of a portrait.

According to another feature of the present invention, three measuring zones are arranged in the form of a generally inverted U-shape having an open left side, so that three object distance measuring zones corresponding to the measuring zones are located in the corresponding arrangement.

With this arrangement, if the CCD image sensors are used as the measuring sensors, it is possible to arrange the transfer registers into generally U-shape appearance with an open left side, thus resulting in a decreased distance of transfer of signal charge. In addition, it is possible to provide the measuring zone corresponding to the center measuring sensors above the center of the finder field of view.

According to an aspect of the present invention, there is provided a focus detecting apparatus comprising a plurality of object distance measuring sensors, each comprising a light receiver including a photoelectric converter array having a number of photoelectric converting elements, a monitor light receiving portion which is located in the vicinity of the photoelectric converter array to detect the quantity of light incident upon the photoelectric converter array, an integral portion which integrates the signal charge obtained by the photoelectric converting elements, a charge holding portion which temporarily holds the signal charge integrated by the integral portion, and a single charge transferring portion which outputs in turn the signal charges held by the charge holding portion, and a control means for transferring the signal charges integrated by the integral portions into the charge holding portions when the quantity of light received by the monitor light receiving portions amounts to a predetermined value or when a predetermined integration time lapses and transferring all the signal charges held by the charge holding portions into the charge transferring portion after the completion of said transferring of signal charges from the charge integral portions to the charge holding portions.

With this arrangement, since the integration time varies in accordance with the brightness of an object, so that when the object has a high brightness, the integration time is reduced accordingly, no saturation of the integral value occurs even for an object of high brightness, thus resulting in a precise object distance signal. In addition to the foregoing, since the integration time can be controlled while monitoring the quantity of light of each object distance measuring sensor, even if there is a large difference in brightness between the object distance measuring zones, a precise object distance signal can be obtained for each object distance measuring zone.

According to another aspect of the present invention, the signal charge which is integrated by the integral portion is temporarily held by the charge holding portion before the signal charge is transferred to the charge transfer portion.

With this feature of the invention, the signal charge integrated by the integral portion can be transferred to the charge holding portion, regardless of the state of the transfer portion, for example, regardless of the transfer of the signal charge. Namely, since the time of integration can be optionally controlled, no saturation of integral values takes place, even for an object of high brightness.

BRIEF DESCRIPTION OF THE DRAWINGS

The invention will be described below in detail with reference to the accompanying drawings, in which:

FIG. 12 is sectional view taken along line XII—XII in FIG. 11A, for explaining the transfer operation of electric charges;

FIG. 13 is a view similar to FIG. 12, for showing the vicinity of the portion of FIG. 11A along which FIG. 12 is sectioned:

FIGS. 20, 21, 22, 23 and 24 are flow charts showing operations of an AF device according to the present invention, of which FIG. 20 is a main flow chart, FIG. 21 is a flow chart of processing of a photometer switch and a release switch;

FIG. 24 is a flow chart of the AF motor stopping operation;

FIG. 28 is a schematic view of outputs of a conventional CCD image sensor;

FIG. 29 is a schematic view showing how to take a picture of a desired main object which is deviated left or right from the center of the field of view, in a conventional camera having a focus detecting device;

DESCRIPTION OF PREFERRED EMBODIMENTS

The following discussion will be directed to preferred embodiments of a single-lens reflex camera which have an automatic focusing unit (referred to as an AF unit) 5 to which the present invention is applied.

Focus Detecting Unit

Figure 1:
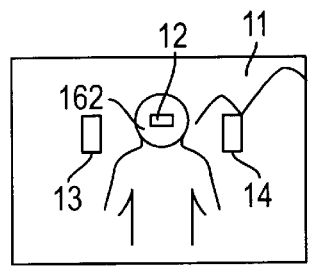
FIG. 1 is a schematic front elevational view of a finder field of view with three measuring zones, in a single-lens reflex camera having a focus detecting apparatus according to the present invention.
Figure 25:
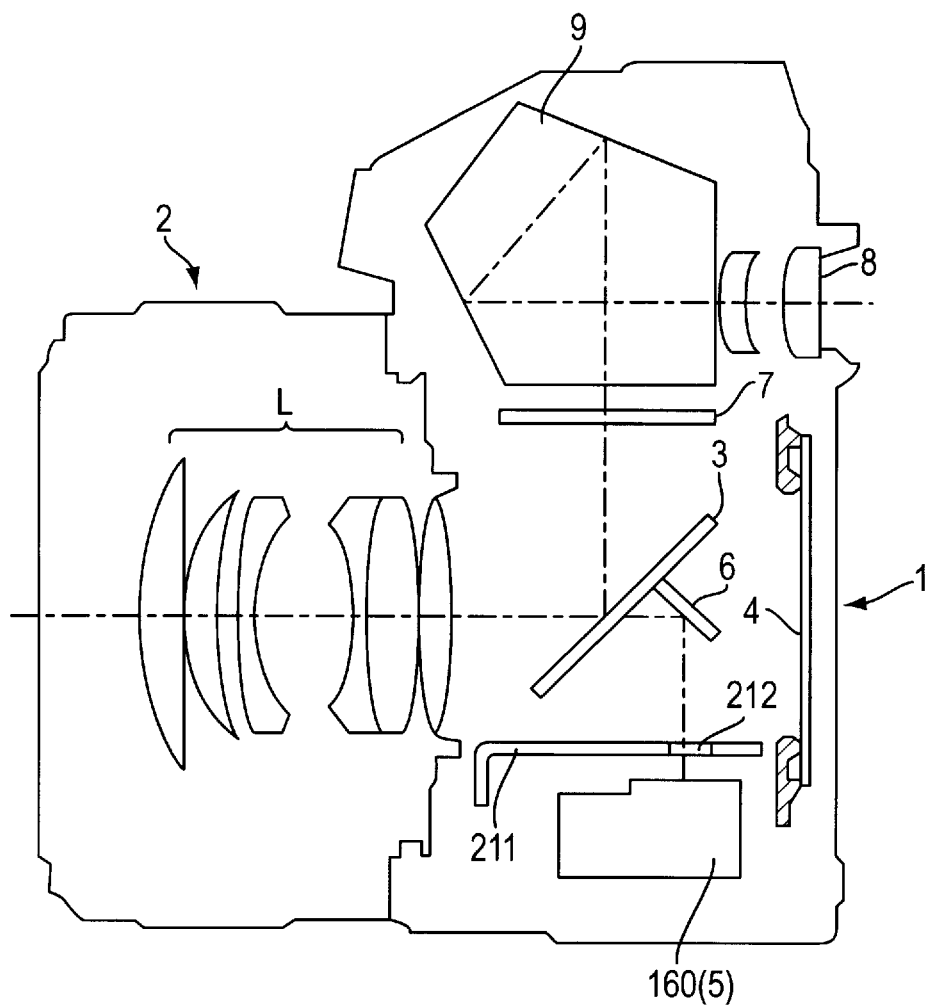
FIG. 25 is a longitudinal sectional view of an AF single-lens reflex camera having a focus detecting apparatus according to the present invention, taken along the optical axis.
Figure 26:
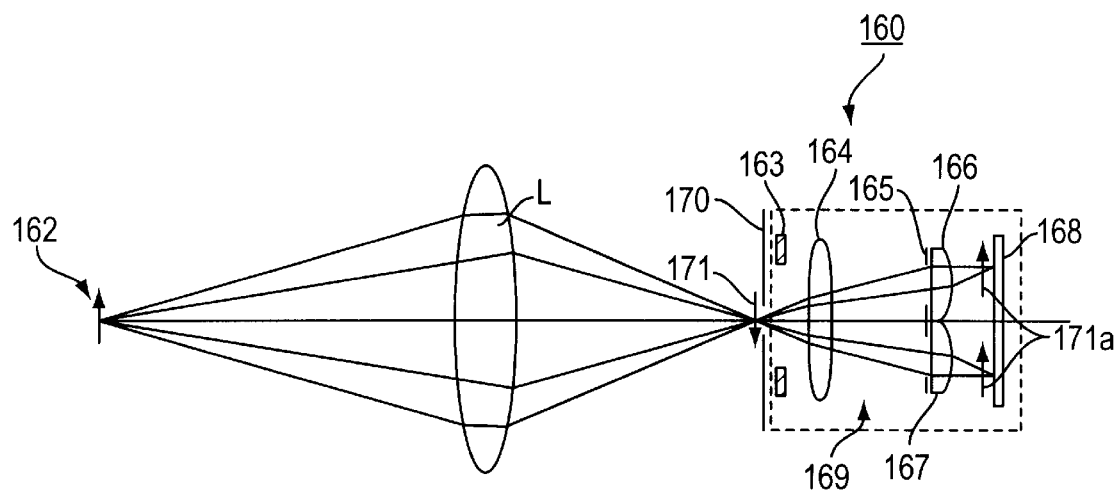
FIG. 26 is a perspective view of a conventional automatic focusing optical system.
Figure 27:
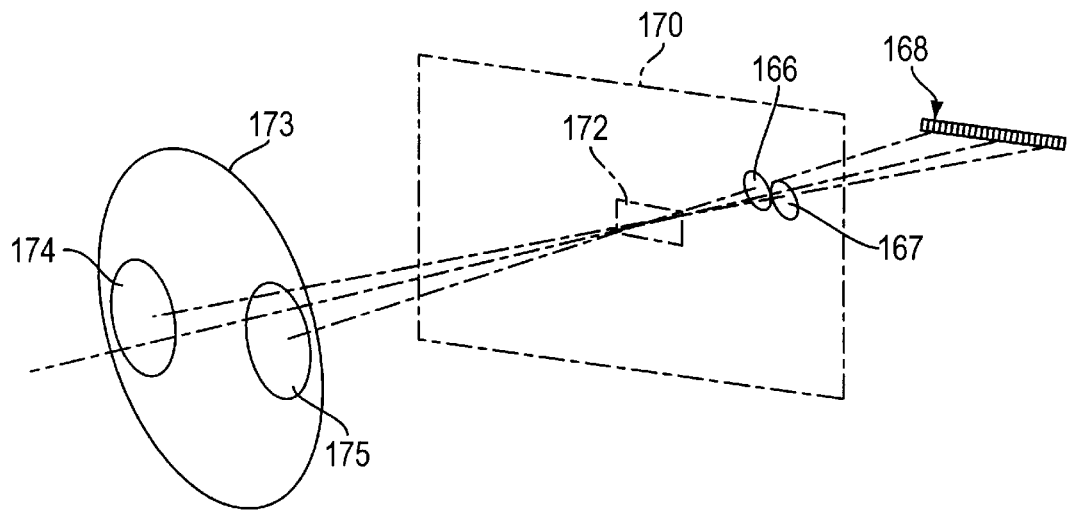
FIG. 27 is a schematic view showing the focusing operation of the focus detecting device shown in FIG. 26.
Figure 30:
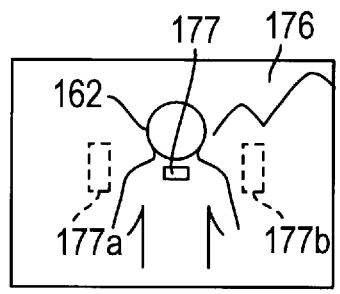
FIG. 30 is an explanatory view of a conventional finder field of view in which a face of a human figure is not located at the center of the field of view.
Figure 31:
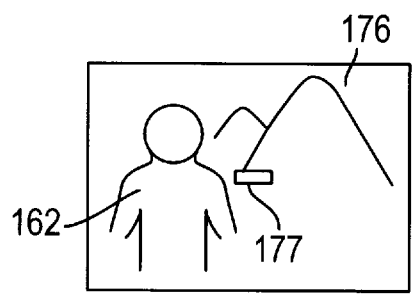
FIG. 31 is an explanatory view showing how to lock the focus in a conventional finder field of view.
Figure 33:
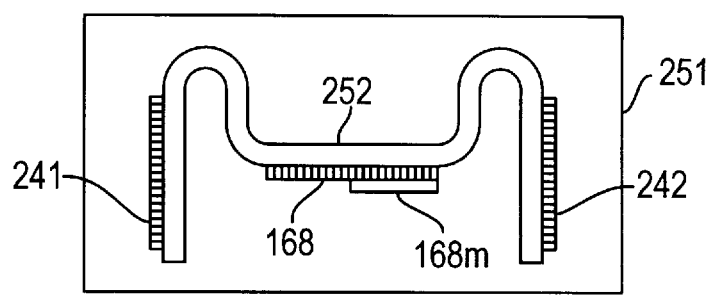
Figure 32:
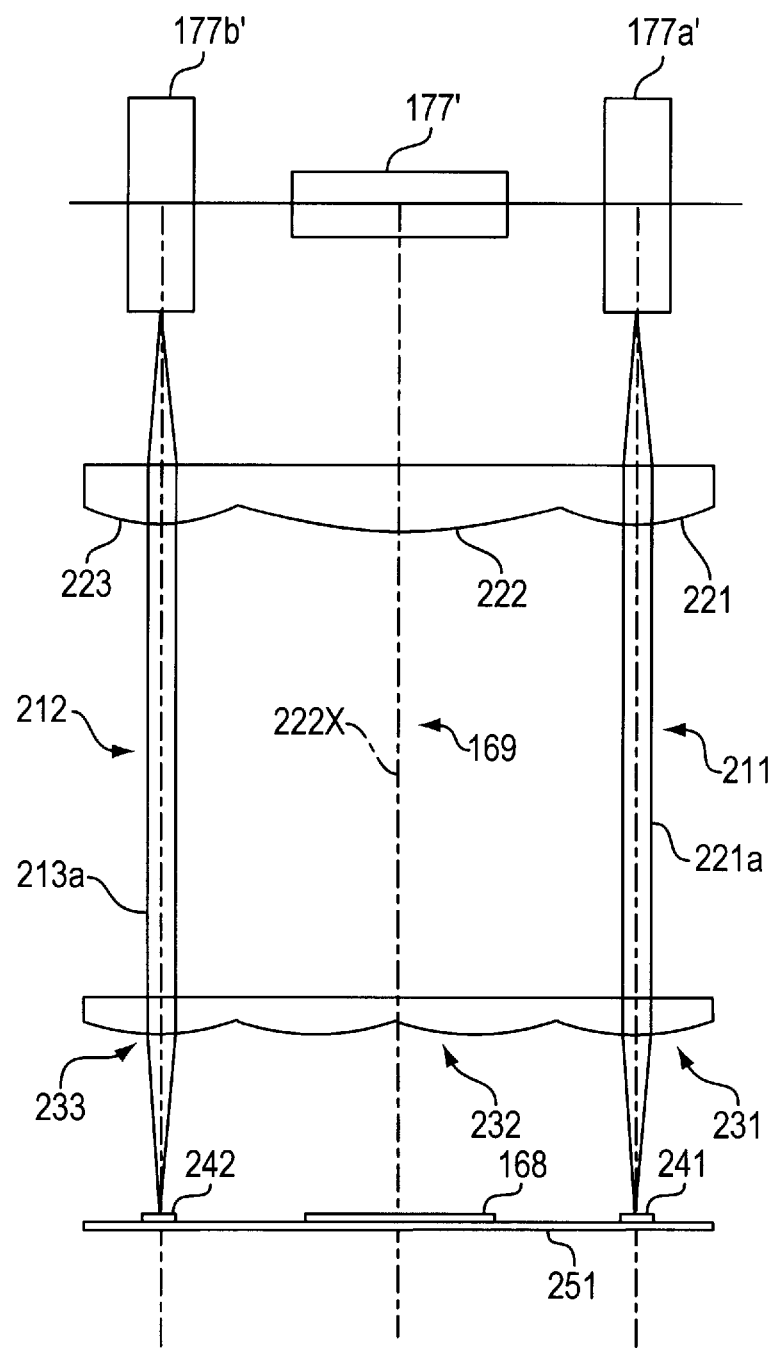
FIG. 32 is an explanatory view of a conventional automatic focusing optical system; and, FIG. 33 is a front elevational view of a light receiving portion of a conventional CCD image sensor and a signal transferring portion.

The AF unit 5 of the present invention can be incorporated into a conventional single-lens reflex camera, as shown in FIG. 25. A first measuring zone 12 is provided in the finder field of view 11 of the finder 8, above the center thereof, as shown in FIG. 1. A pair of second and third measuring zones 13 and 14 are provided on opposite sides of the center measuring zone 12. The measuring zones 12, 13 and 14 are made visible, for example, by frame lines formed on a focusing glass 7 (FIG. 25).

Figure 2:
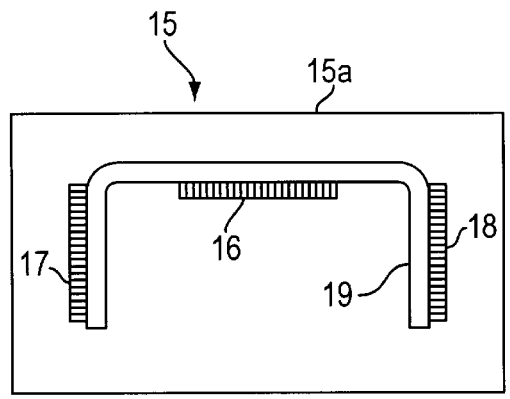
FIG. 2 is a front elevational view of a CCD image sensor shown in FIG. 1.

The as shown in FIG. 2, AF unit 5 is provided with a CCD image sensor unit 15 which includes a single integrated circuit board 15a which is provided thereon with three CCD image sensors (first, second and third sensors) 16, 17 and 18, which are arranged in a generally inverted U-shape to receive the luminuous fluxes of object in the measuring zones 12, 13 and 14. Numeral 19 designates a transfer register which serves as a charge transferring portion to read the signal charges accumulated by the CCD image sensors 16, 17 and 18.

As can be seen from the foregoing, since the first measuring zone 12 is located above the center portion of the finder field of view and since the first CCD image sensor 16 is located at the light receiving position at which it receives the luminuous flux of the object in the first measuring zone 12, upon taking a picture of a human figure, the face of the human figure substantially coincides with the first measuring zone 12. Namely, the point of view of a photographer who looks at the finder field of view 11 coincides with the first measuring zone 12, resulting in no miss of a chance to take a photograph.

Figure 3:
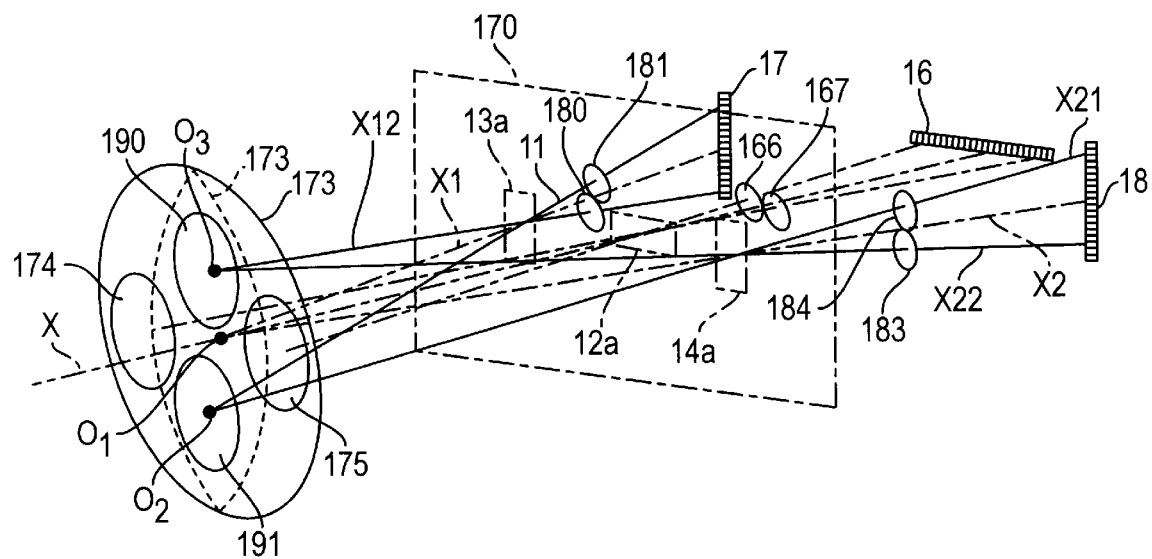
FIG. 3 is a schematic perspective view of an automatic focusing optical system shown in FIG. 1.
Figure 4:
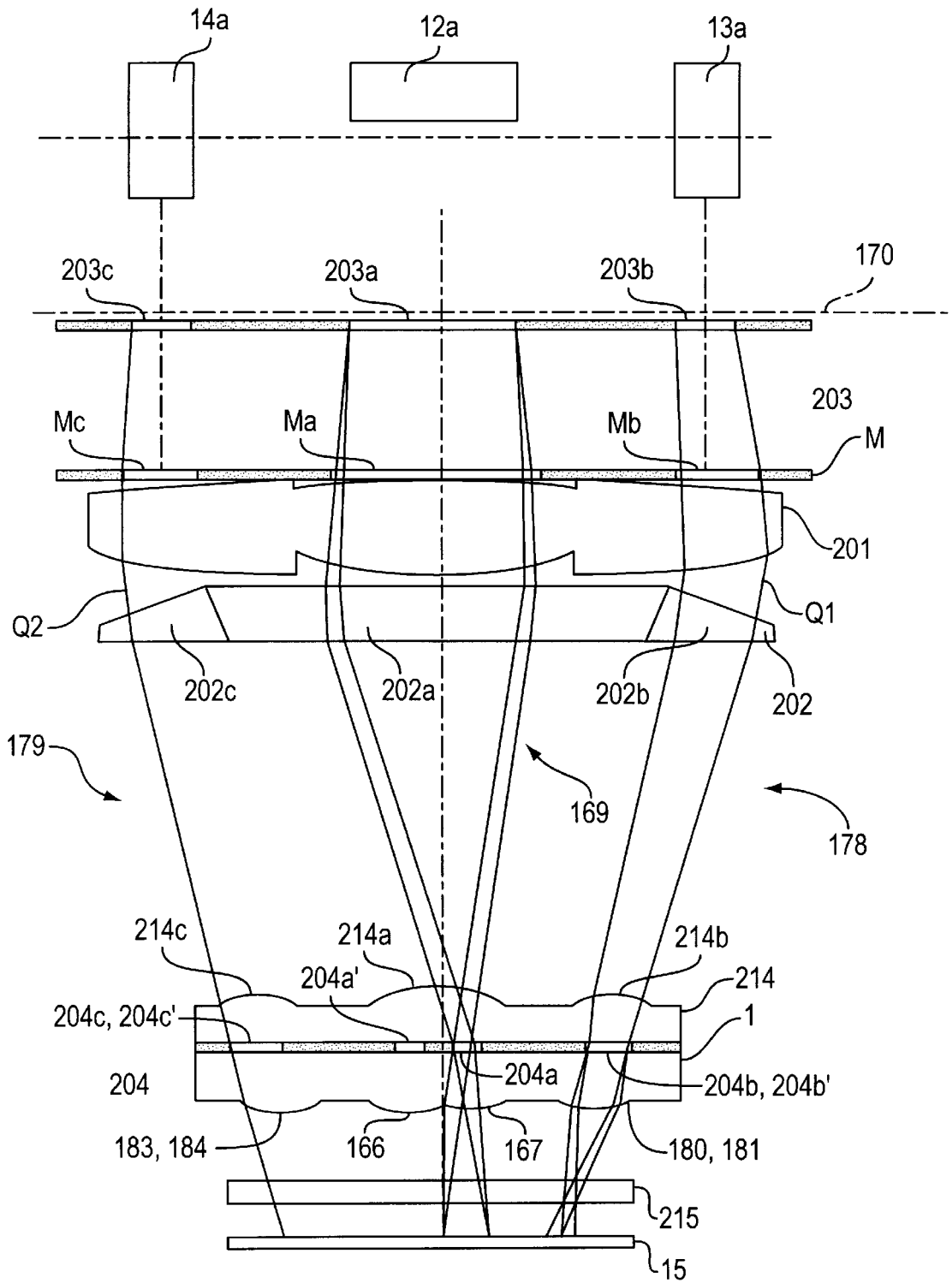
FIG. 4 is a plan view of an automatic focusing optical system shown in FIG. 3.

FIGS. 3 and 4 show a focus detecting optical system provided in the AF unit 5. The focus detecting optical system has a first automatic focusing optical system 169 (which will be referred to as a first AF optical system hereinafter) and a pair of second automatic focusing optical system (second AF optical system) 178 and third automatic focusing optical system (third AF optical system) 179 for converging the luminuous fluxes of the objects in the measuring zones 12, 13 and 14 onto the CCD image sensors 16, 17 and 18, respectively.

The field of view 12a of the center measuring zone and the fields of view of the circumferential measuring zones 13a and 14a conjugate with the measuring zones 12, 13 and 14 are formed on the film equivalent plane 170 in the AF optical systems 169, 178 and 179. Aerial images of the objects in the measuring zones 12, 13 and 14 are formed on the fields of view 12a, 13a and 14a.

Figure 9:
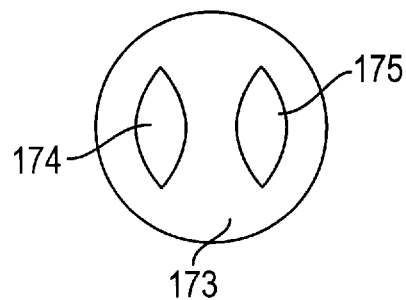
FIG. 9 is an explanatory view of an exit pupil and an aperture area when a photographing lens of a camera is viewed through a measuring zone of an automatic focusing optical system which is substantially and optically conjugate with the center measuring zone of the finde.

In FIG. 3, an exit pupil of the photographing lens group L is shown at 173 by a solid line, as viewed through the fist measuring field of view 12a of the first AF optical system 169. The exit pupil 173 is substantially circular, as shown in FIG. 9. The opening areas 174 and 175 as viewed through the separator lenses 166 and 167 are substantially eliptical, as shown in FIG. 9.

Figure 10:
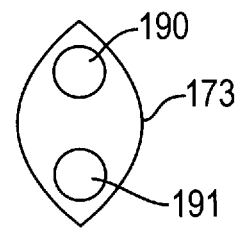
FIG. 10 is an explanatory view of an exit pupil and an aperture area when the exit pupil shown in FIG. 3 is influenced by so-called vignetting.

The exit pupil 173 of the photographing lens group L, as viwed through the circumferential fields of view 13a and 14a, is shown by a dotted line in FIG. 3. The exit pupil 173, shown at the dotted line, is substantially eliptical. The opening areas 190 and 191 in which the luminous flux is passed through the separator lenses 180, 181 and 183, 184 is circular, as shown in FIG. 10.

The AF unit 5 has a view mask 203, a condenser lens 201, a mask M located in front of the condenser lens 201, a prism plate 202 located in the rear of the condenser lens 201, an auxiliary lens 214, a separator lens I, a diaphragm mask 204 provided between the auxiliary lens 214 and the separator lens I, a cover glass 215, and an integrated circuit board 15a which has the CCD image sensors 16, 17 and 18 (measuring sensors) formed thereon.

Figure 6:
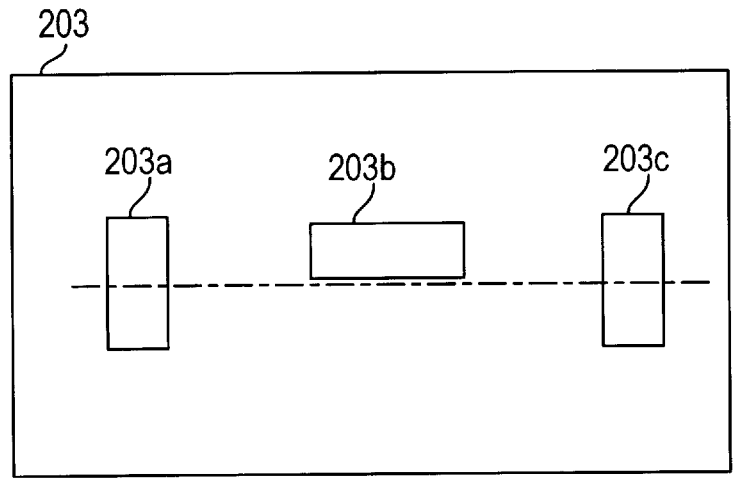
FIG. 6 is a front elevational view of a view mask used in the present invention.

The view mask 203 has openings 203a, 203b and 203c for forming the center field of view 12a and the circumferential fields of view 12b and 12c (FIG. 6). These openings are positioned having a generally inverted U-shape form. The mask M has openings Ma, Mb and Mc corresponding to the measuring zones 12, 13 and 14, in the shape of a U corresponding to the shape formed by the openings 203a, 203b and 203c.

Figure 7:
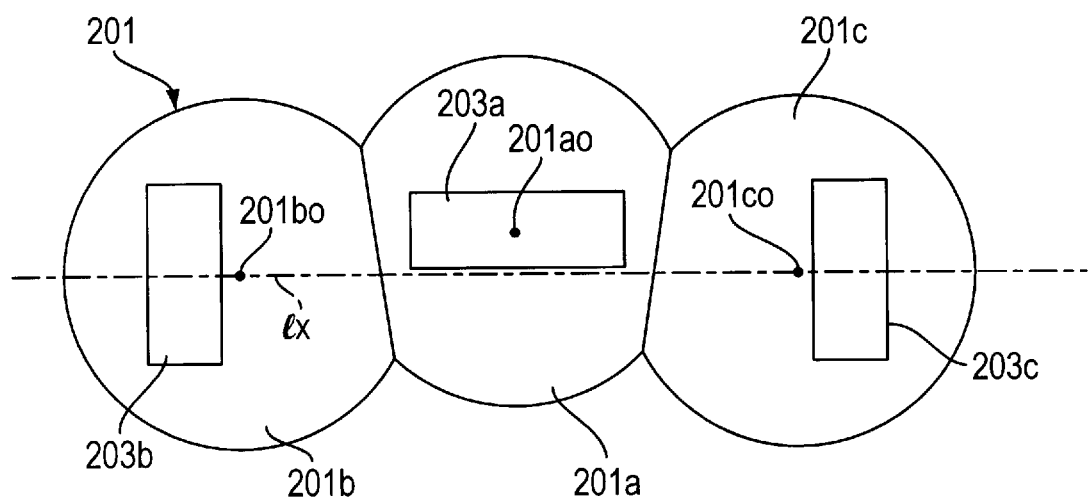
FIG. 7 is a front elevational view of a condenser lens used in the present invention.

As shown in FIG. 7, the condenser lens 201 has three condenser lens portions 201a, 201b, and 201c, so that the optical axis of the condenser lens 201a is located above line lx which connects the optical axes 201b0 and 201c0 of the condenser lens portions 201b and 201c at a predetermined distance therefrom in. In FIG. 7, both the condenser lens 201 and the view mask 203 are shown to illustrate the positional relationship between the condenser lens portions 201a, 201b, 201c and the openings 203a, 203b, 203c of the view mask 203.

The prism plate 202 has a center parallel plane portion 202a and prisms 202b and 202c on. Returning to FIG. 4, the opposite sides of the center parallel plane portion 202a. The separator lens I has separator lens portions 166, 167, 180, 181, 183 and 184. The auxiliary lens 214 has auxiliary lens portions 214a, 214b and 214c.

Figure 8:
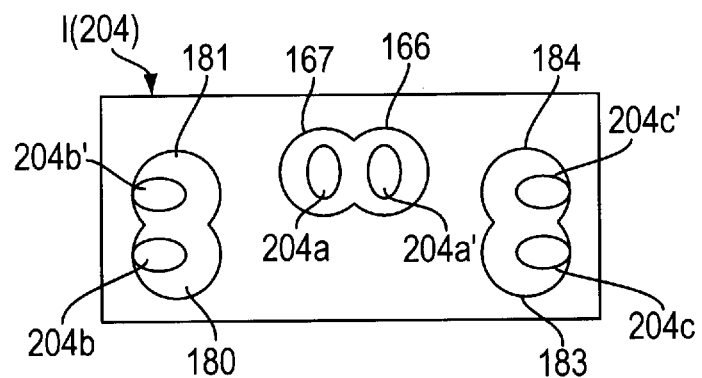
FIG. 8 is a schematic view showing a separator lens according to the present invention.

The diaphragm aperture 204 has eliptical openings 204a, 204a', 204b, 204b', 204c and 204c' corresponding to the separator lens portions 166, 167, 180, 181, 183 and 184, as shown in FIG. 8.

In the illustrated embodiment, the distance between the view mask 203 and the condenser lens 201 is approximately 3.55 mm; the distance between the mask M and the condenser lens 201 is approximately 0.20 mm; and the openings 203a, 203b and 203c form a rectangle of approximately 3.75 mm×1.4 mm.

The radii of curvature of the surface (upper surface in FIG. 4) of the condenser lens portions 201a, 201b and 201c adjacent to the mask M and the opposite surface thereof are approximately 18.504 mm and 7.496 mm, respectively, so that the thickness of the center portion thereof is approximately 2.0 mm.

The radii of curvature of the surface (upper surface in FIG. 4) of the separator lens portions 166, 167, 180, 181, 183 and 184 adjacent to the diaphragm mask 204 and the opposite surface thereof are approximately equal to ∞ and 1.750 mm, respectively, so that the thickness of the center portion thereof is approximates 1.25 mm.

The radii of curvature of the surfaces of the auxiliary lens portions 214a, 214b and 214c on the light incident side and the light emitting side are approximately equal to 10.416 mm and ∞, respectively, so that the thickness of the center portion thereof is approximately equal to 1.20 mm.

The diaphragm mask 204 has a thickness of approximately equal to 0.04 mm, and the major and minor diameters of the openings 204a, 204a'~204c, 204c' are approximately equal to 0.96 mm and 0.48 mm, respectively.

The thickness of the cover glass 215 is approximately equal to 0.50 mm and the distance between the cover glass 215 and the separator lens I is approximately 1.64 mm.

The distance between the condenser lens 201 and the auxiliary lens 214 is approximately 10.5 mm.

On the opposite sides of the first AF optical system 169 are provided the second and third Af optical system 178 and 179 for measuring the circumferential zone. The first AF optical system 169 is composed of the view mask 203, the mask M, the condenser lens portion 201b, the separator lens portions 166 and 167, and the auxiliary lens portion 214a. The second AF optical system 178 is composed of the view mask 203, the mask M, the condenser lens 201a, the prism 202a, the auxiliary lens portion 214b and the separator lens portions 180 and 181. The third AF optical system 179 is composed of the view mask 203, the mask M, the condenser lens portion 201c, the prism 202a, the auxiliary lens portion 214b and the seperator lens portions 183 and 184.

The focus detecting apparatus comprises by the first, second, and third AF optical systems 169, 178, 179, and the first, second, third image sensors 16, 17 and 18.

The first CCD image sensor 16 of the sensor unit 15, shown in FIG. 2, is located on the center optical axis X of the first AF optical system 169 (FIG. 3). The second CCD image sensor 17 is located on the center optical axis X1 of the second AF optical system 178, and the third CCD image sensor 18 is located on the center optical axis X2 of the third AF optical system 179. The signal charges accumulated in the CCD image sensors 16, 17 and 18 are successively outputted as video signals through a transfer register 19 in the shape of a U to be transferred to the control circuit.

As mentioned above, since the CCD image sensors 16, 17 and 18 are arranged in the shape of general U on a single substrate, the transfer register 19 can be generally arranged in the shape of U. As a result, it is not necessary for the transfer register 19 to be bent as in the prior art, so that the transfer distance of the received signals can be decreased.

Luminous fluxes Q1 and Q2 (FIG. 4), which are incident upon the second and third CCD image sensors 17 and 18 from the condenser lens portions 201a and 201c to be converged thereon, are bent toward the center first CCD image sensor 16 by the prisms 202b and 202c of the prism plate 202, so that the distances between the CCD image sensors 16, 17 and 18 can be decreased, resulting in a realization of a small integrated circuit board 15a. In the illustrated embodiment, the integrated circuit board 15a could be approximately 6mm×6mm. The conventional integrated circuit board is usually 12~14 mm×12~14 mm.

In FIG. 4, the luminous flux which is incident through the opening 204a' of the diaphragm mask 204 to form an image on the first CCD image sensor 16 is similar to the luminous flux which is incident through the opening 204a of the diaphragm mask 204 to form an image on the first CCD image sensor 16, and accordingly is omitted.

Figure 5:
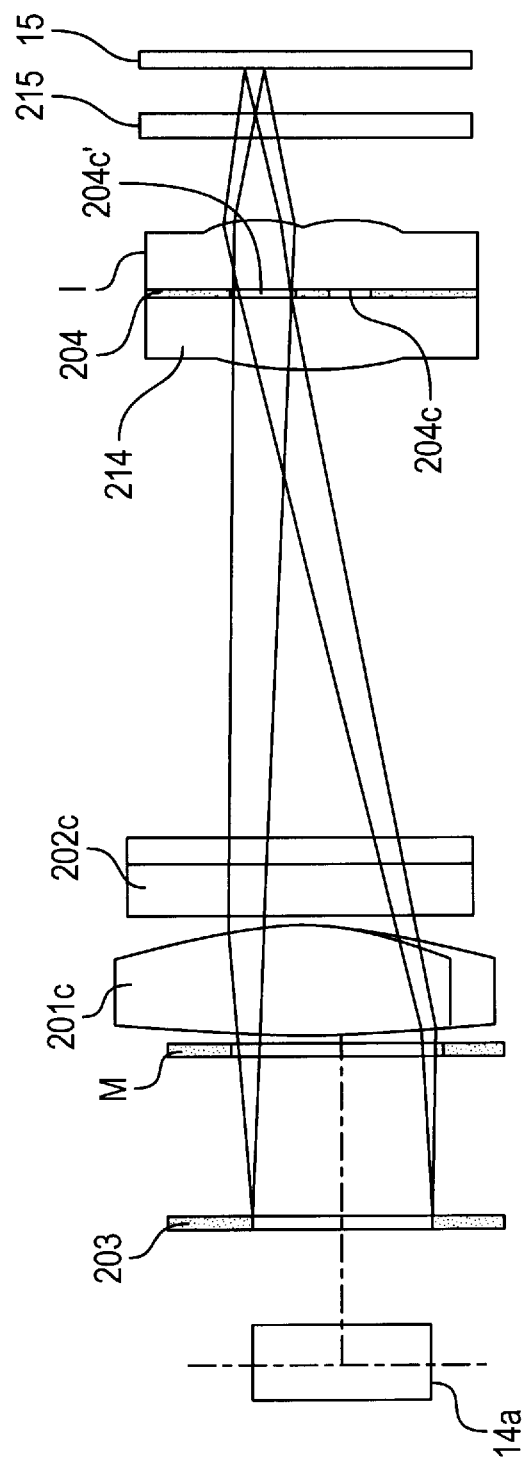
FIG. 5 is a side elevational view of an automatic focusing optical system shown in FIG. 4.

Similarly, in FIG. 5, the luminous flux which is incident through the opening 204c of the diaphragm mask 204 to form an image on the second CCD image sensor 17 is similar to the luminous flux which is incident through the opening 204c' of the diaphragm mask 204 to form an image on the third CCD image sensor 18, and accordingly is omitted.

In FIG. 3, the separator lenses 180, 181, 183 and 184 are located one on another, so that they are substantially optically conjugate with the exit pupil 173 of the photographing lens group L through the condenser lens 201 and the prism plate 202 (FIG. 4), whereby the upper and lower opening areas 190 and 191 of the exit pupil 173 are viewed through the circumferential measuring fields of view 13a and 14a.

The reason that the separator lenses 180 and 181 and, the separators 183 and 184 are put one on another is that the luminous flux which is incident upon the circumferential measuring field of views 13a and 14a through the photographing lens group L is an oblique luminous flux, so that the exit pupil 173 of the photographing lens group L, as viewed from the circumferential measuring field of views 13a and 14a is of a slightly flatly deformed shape, due to a vignetting, as shown in FIG. 10. Therefore, if the opening areas 190 and 191 are arranged side by side in the horizontal direction, the substantial lens distance between the separator lenses 180 and 181 (separator lenses 183 and 184) is decreased, resulting in an insufficient base length and a decreased accuracy of the detection of the image distance.

In FIG. 3, the optical axes X1 and X2 of the second and third AF optical systems 178 and 179 intersect the center 01 of the exit pupil 173. X11, X12 and X22 designate the optical axes of the separator lens 181, the separator lens 180 and the separator lens 183, respectively. The optical axes X11 and X21 intersect each other at the center 02 of the opening area 191 and the optical axes X12 and X22 intersect each other at the center 03 of the opening area 190.

Construction of Object Distance Measuring Sensor

Figure 11A:
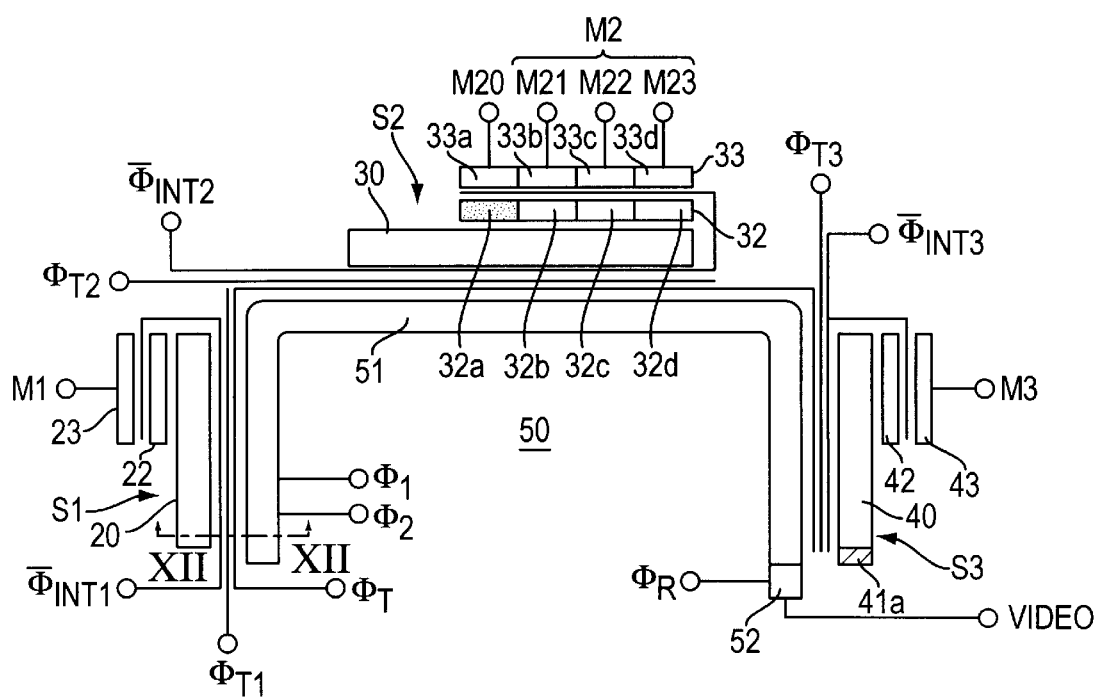
FIG. 11A is a front elevational view of a CCD image sensor of an AF device according to an embodiment of the present invention.

FIG. 11A shows an object distance measuring sensor unit in which self-scanning image sensors are used according to the present invention. In the illustrated embodiment, although the self-scanning image sensors are used as the CCD image sensors, the present invention is not limited thereto. For instance, BBD, CID or MOS image sensors can be used in place of the self-scanning image sensors.

The focus detecting apparatus has an AF optical system similar to the first AF optical system 169 shown in FIGS. 3 and 4 and three light receiving portions S1, S2 and S3 as an object distance measuring sensor. The light receiving portions S1, S2 and S3 contain the second CCD image sensor 20, first CCD image sensor 30 and third CCD image sensor 40 which receive the luminous fluxes of the objects in the second measuring zone 13, first measuring zone 12 and third measuring zone 14, respectively.

The CCD image sensors 20, 30 and 40 are provided on the same integrated circuit board 50 and each image sensor has an array having a large number of photoelectric converting elements (e.g. 100 photodiodes). The third CCD image sensor 40 is provided on one end with an intercepted photoelectric converting elements 41a.

The CCD image sensors 20, 30 and 40 are arranged so that the center first CCD image sensor 30 lies in the horizontal plane, and the second and third CCD image sensors 20 and 40 are located on the lower left and right sides of the center CCD image sensor 30 to lie in the vertical planes, so that the CCD image sensors 20, 30 and 40 form a generally inverted U-shaped shape.

The corresponding, generally U-shaped single transfer register 51 is provided inside the CCD image sensors 20, 30 and 40 to transfer the electrical charges. The transfer register 51 is provided on one end with a CCD output portion 52, so that the signal charges accumulated by the CCD image sensors 20, 30 and 40 are successively read out as video signals from the CCD output portion 52.

The second and third light receiving portions S1 and S3 have monitor light receiving portions 22 and 42 which are located outside the second and third CCD image sensors 20 and 40 and which have lengths that are approximately half the lengths of the respective CCD image sensors 20 and 40. Similarly, the first light receiving portion S1 has a monitor light receiving portion which is located above the first CCD image sensor 30 and which has a length approximately half the length of the CCD image sensor 30. The monitor output portions 23, 33 and 43 are provided outside the monitor light receiving portions 22, 32 and 42.

The aerial image of the objects in the measuring zones 12, 13 and 14 are divided and formed on the CCD image sensors 20, 30 and 40 and the monitor light receiving portions 22, 32 and 42.

The transfer registor 51 has a reset terminal $\Phi_R$ connected thereto, so that every time one video signal is output from the CCD output portion 52, a reset signal is input thereto to reset the video signal.

Each of the CCD image sensors 20, 30 and 40 have a large number of photoelectric converting elements (photodiodes) which are aligned in the longitudinal direction. Adjacent to the CCD image sensors 20, 30 and 40 are provided respective integral gates ST, so that the signal charges converted by the photoelectric converting elements are integrated (accumulated) at the portion of the integrated circuit board located below the integral gates ST (FIGS. 12 and 13).

The gates $\overline{\Phi}_{INT1}$, $\overline{\Phi}_{INT2}$ and $\overline{\Phi}_{INT3}$, which are integral control gates provided between the transfer register 51 and the associated CCD image sensors 20, 30 and 40, independently control the start and stop of the accumulation (integration) of the charges in the CCD image sensors 20, 30 and 40. The integral starts and stops when the integral control gates $\overline{\Phi}_{INT1}$, $\overline{\Phi}_{INT2}$ and $\overline{\Phi}_{INT3}$ are Low (L) and High (H) respectively.

The gates $\Phi_{T1}$, $\Phi_{T2}$ and $\Phi_{T3}$ provided between the transfer register 51 and the associated CCD image sensors 20, 30 and 40 are charge holding gates which form the charge holding portion for temporarily holding the integrated signal charges. The gates $\Phi_T$ are shift gates which transfer the signal charges temporarily accumulated by the gates $\Phi_{T1}$, $\Phi_{T2}$ and $\Phi_{T3}$ at one time. The charge holding portion is constituted by the charge holding gates $\Phi_{T1}$, $\Phi_{T2}$ and $\Phi_{T3}$, and the portions of the integrated circuit board located below those gates.

The transfer gates $\Phi_1$ and $\Phi_2$ are provided on the surface of the transfer registor 51 along the length thereof. The two-phase clock pulses are input to the transfer gates $\Phi_1$ and $\Phi_2$, so that the signal charges transferred to the transfer registor 51 are successively transferred to the CCD output portion 52.

The monitor light receiving portions 22, 32 and 42 are composed of photoelectric converting elements. The charges converted by the monitor light receiving portions 22, 32 and 42 are accumulated in the portions of the integrated circuit board under the integral gate ST. The integral values are detected by the monitor output portions 23, 33 and 43 and are fed to a control circuit (which will be explained hereinafter) through the monitor output terminals M1, M2 and M3. The signals are then supplied to a micro computer through the control circuit to monitor the same. The integral (accumulation) of the charges in the monitor light receiving portions 22, 32 and 42 starts and stops when the integral control gates $\overline{\Phi}_{INT1}$, $\overline{\Phi}_{INT2}$ and $\overline{\Phi}_{INT3}$ are "L" and "H", respectively, as mentioned above.

Each of the monitor light receiving portions 22, 32 and 42 and the monitor output portions 23, 33 and 43 are comprised of four pieces. Only four monitor light receiving pieces 32a, 32b, 32c and 32d of the center monitor light receiving portion 32 and only four monitor output pieces 33a, 33b, 33c and 33d of the center monitor output portion 33 are shown in FIG. 11A for simplification. The charges produced by the monitor light receiving pieces 32a, 32b, 32c and 32d are accumulated in the portions of the integrated circuit board under the respective integral gates ST and are discharged at the completion of the integral operation. The integral values are detected by the monitor output pieces 33a, 33b, 33c and 33d, respectively.

Figure 15A:
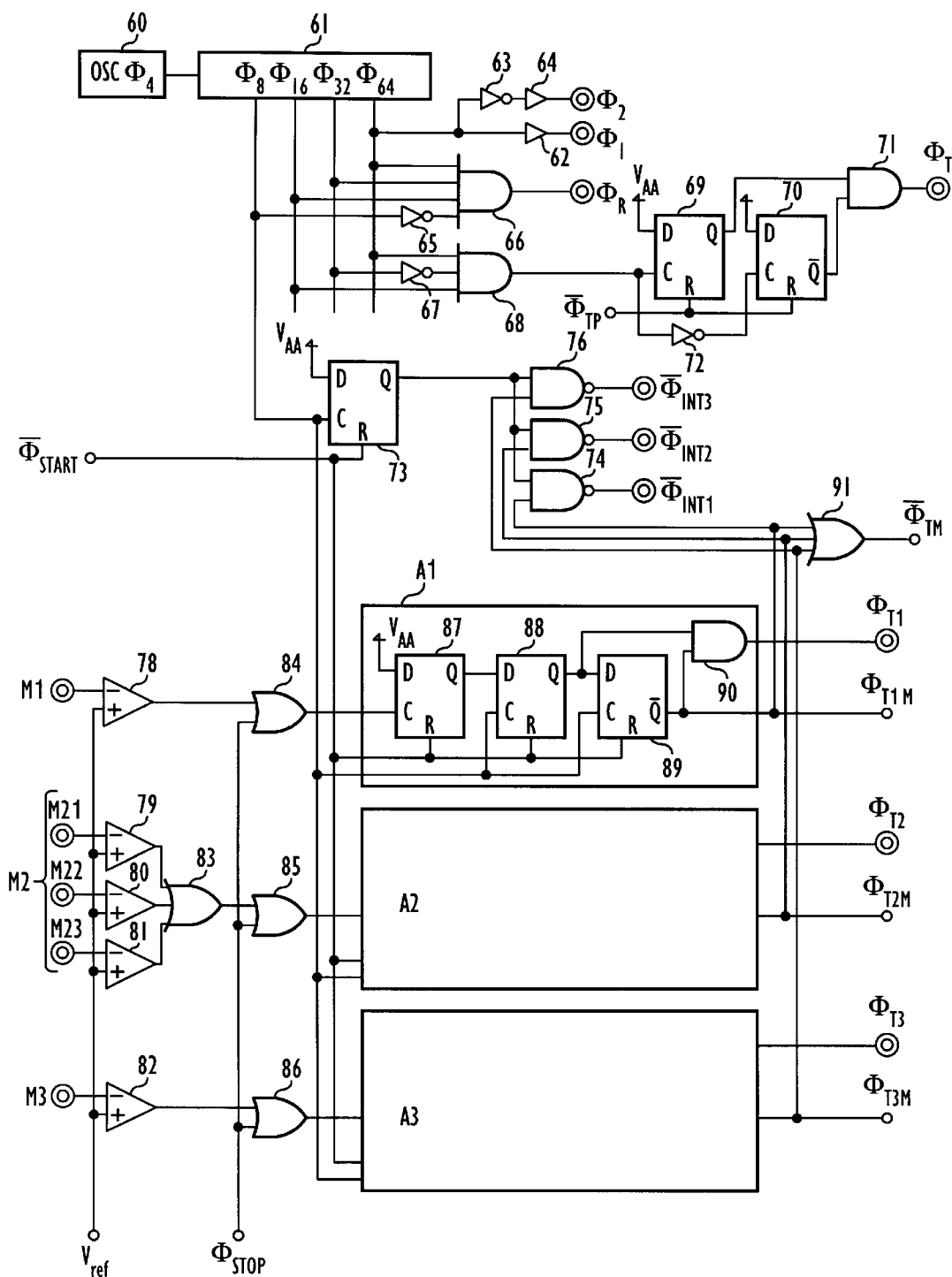
FIG. 15A is a diagram showing a driving control circuit of a CCD image sensor shown in FIG. 11A.

Monitor output terminals M20, M21, M22 and M23 are connected to the monitor output pieces 33a, 33b, 33c and 33d. The monitor output terminal M20 is connected to an operation amplifier 119 (FIG. 18), and the monitor output terminals M21, M22 and M23 are connected to operation amplifiers 79, 80 and 81, respectively (FIG. 15A).

Figure 16:
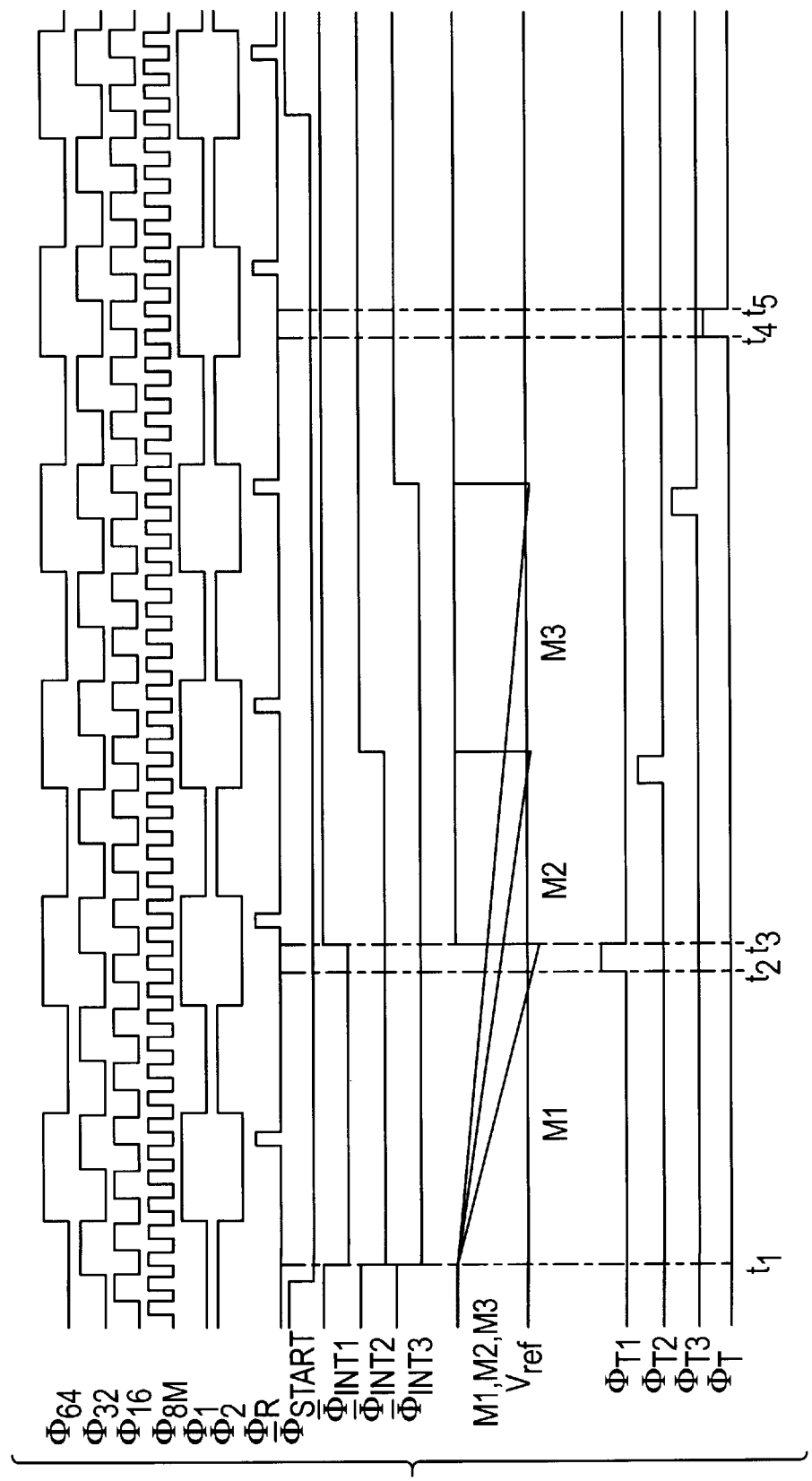
FIG. 16 is a diagram showing a time chart of a CCD image sensor.
Figure 18:
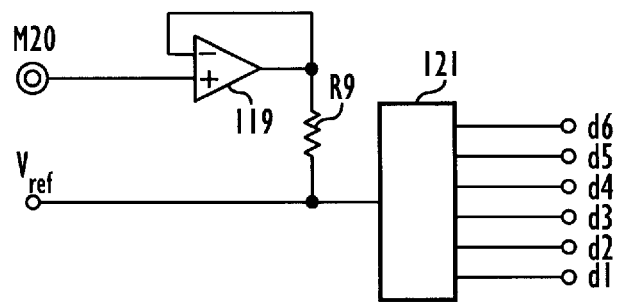
FIG. 18 is a diagram showing a circuit for generating a monitor reference voltage Vref.

The monitor light receiving piece 32a which is connected to the monitor output terminal M20 intercepts the light incident thereupon. The dark current produced by the monitor light receiving piece 32a is removed from the reference voltage to obtain a precise monitor reference voltage Vref (FIGS. 16 and 18).

In the illustrated embodiment mentioned above, although the monitor light receiving portions 22, 32 and 42 are provided separately from the CCD image sensors 20, 30 and 40, it is possible to use parts of the photoelectric converting elements of the CCD image sensors 20, 30 and 40 to form the monitor light receiving portions 22, 32 and 42.

Operation of Measuring Sensor

The operation of the transfer of charges of the light receiving portions will be explained below with reference to FIGS. 12, 13 and 16.

FIG. 12 (A) is a sectional view taken along line XII—XII in 11. FIGS. 12(B) to 12(F) are schematic views showing the transfer operation of the charges.

An integral gate ST is located on the right side of the photoelectric converting element 21 of the second CCD image sensor 20 in the vicinity thereof. The gates $\Phi_{T1}$, $\Phi_T$ and $\Phi_{CCD}$ are located in this order on the right side of the integral gate ST.

The photoelectric converting element 21, the integral gate ST, and the gates $\Phi_{T1}$, $\Phi_T$ are provided on the integrated circuit board 50 at a predetermined distance along a direction perpendicular to the length thereof. Gate $_{CCD}$ comprises gates 1 and 2, which are alternately provided on the transfer registor 51 in a direction of the length thereof.

The integral operation and the transfer operation of the charges of the CCD image sensors 20, 30 and 40 will be explained below. The following explanation will be directed to the second CCD image sensor 20 by way of an example.

A constant voltage is applied to the integral gate ST. When the integral is commenced at t1, the signal charges converted by the photoelectric converting element 21 is accumulated, i.e. integrated by the integral gate ST (FIG. 12(A)). During the integral, the gates $\Phi_{T2}$ and $\Phi_T$ are all "L" (FIG. 16).

When the integral value of the monitor light receiving portion 22 reaches the monitor reference voltage Vref at t2, the gate $\Phi_{T1}$ turns to "H". As a result, since the potential of the gate $\Phi_{T1}$ is below the potential of the gate ST, the accumulated charges under the gate ST move to the portion under the gate $\Phi_{T1}$ (FIG. 12(C)). At t3, the gate $\Phi_{T1}$ is "L", so that the charges moved under the gate $\Phi_{T1}$ are confined and temporarily held in the potential well thereof (FIG. 12(D)).

When the gate $\Phi_T$ is "H" at t4, the potential of the gate $\Phi_T$ is below the potential of the gate $\Phi_{T1}$. The voltage "H" is applied to the gate $\Phi_{CCD}$. The potential of the gate $\Phi_{CCD}$ is below that of the gate $\Phi_T$, and accordingly, the electric charge of the gate $\Phi_{T1}$ moves to the gate $\Phi_{CCD}$ and accordingly, the transfer registor 51 (FIG. 12(E)).

When the gate $\Phi_T$ turns to "L" at t5, the charge moved to the transfer registor 51 is maintained therein (FIG. 12(F)).

Thus, the integral operation and the temporary holding of the signal charges which are converted by the photoelectric converting element 21 and the transfer of the signal charges to the transfer registor 51 are completed. The charges transferred to the transfer registor 51 are successively transferred to the CCD output portion 52 in accordance with the known two-phase clock pulses by the gates $\Phi_1$ and $\Phi_2$ to be output as video signals from the CCD output portion 52.

As can be seen from the above explanation, according to the illustrated embodiment of the present invention, since the electric charges which are converted and integrated by the photoelectric converting elements 21 are temporarily held by the charge holding gates $\Phi_{T1}$ (strictly speaking, the portions of the integrated circuit board under the charge holding gates $\Phi_{T1}$), the integral operation can be finished at an optional time, regardless of the level of the gates $\Phi_{CCD}$ of the transfer registor 51.

The signal charges accumulated (integrated) by the CCD image sensors 30 and 40 are similarly transferred to the transfer registor 51. When all the electric charges of the CCD image sensors 20, 30 and 40 are transferred to the transfer registor 51, the latter outputs the video signals in the order of the CCD image sensors 40, 30 and 20 in accordance with the two-phase clock pulses through the CCD output portion 52.

Since the aerial object images divided by the separator lens 14 are input to the CCD image sensors 20, 30 and 40, front halves of the video signals of the CCD image sensors 20, 30 and 40 form one image signal and the rear halves of the video signals forms another image signal.

The micro computer (object distance arithmetic means) which receives the video signals performs the necessary processes (i.e., predictor arithmetic) to detect the phase difference of the images thereby to detect a defocus value and the number of revolutions and the direction of rotation of the AF motor.

FIG. 13(A) shows a starting portion of the accumulation (integration) of the electric charges of the second light receiving portion S1, and FIGS. 13(B) and (C) schematically show the accumulating operation of the charge accumulating portion thereof.

Proximate to the gate S1 is provided the integral control gate $\overline{\Phi}_{INT1}$ and the gate $\Phi_{T1}$ which are alternatively located in the longitudinal direction.

An electrical doping having an N$^+$ charge is formed under the integral control gate $\overline{\Phi}_{INT1}$, and on the downstream side (right side in FIG. 13) of an electrical doping having a P$^+$ electrical charge, so that the signal charges can be discharged into the bottom of the integrated circuit board.

With this arrangement, when the integral control gate $\overline{\Phi}_{INT1}$ is "L" in comparison with the potential of the gate ST (strictly speaking, the portion under the gate), the potential of the portion of the N$^+$ dope is high. On the contrary, when the integral control gate $\overline{\Phi}_{INT1}$ is "H", the potential of the portion of the P$^+$ dope is low and the potential of the N$^+$ dope is lower than the potential of the P$^+$ dope.

Accordingly, the integral control gate $\overline{\Phi}_{INT1}$ is "L" at the time t1 of the commencement of the integration, so that the charges produced by the photoelectric converting element 21 are accumulated in the gate ST (strictly speaking, the portion under the gate), as shown in FIG. 13(B).

The integral control gate $\overline{\Phi}_{INT1}$ is "H" at the time t2 of the end of the integration, so that the charges produced by the photoelectric converting element 21 are moved from the gate ST (strictly speaking, the portion under the gate) to the portion of N$^+$ doping of the integral control gate $\overline{\Phi}_{INT1}$ to be discharged, as shown in FIG. 13(C).

Figure 14A:
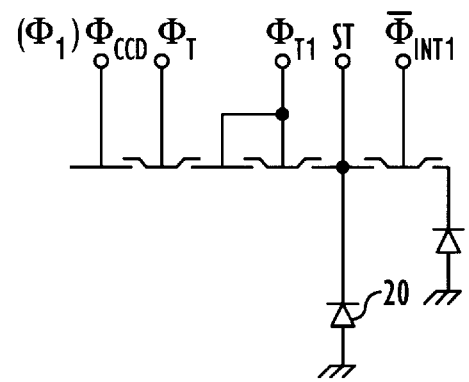
FIG. 14A is a sectional view of a CCD image sensor, similar to FIG. 12, but according to another embodiment of the present invention.

FIG. 14A shows another embodiment equivalent to the above-mentioned embodiment. In this alternative embodiment, the photoelectric converting element 21 is spaced from the array of the gates and is aligned with respect to the gate ST in the vertical direction. The integral control gate $\overline{\Phi}_{INT1}$ and the gate $\Phi_{T1}$ are located on the opposite sides of the gate ST. The sequential control and the operation of the start and stop of the integration and the transfer of the signal charges are similar to those of the embodiment mentioned above.

Figure 14B:
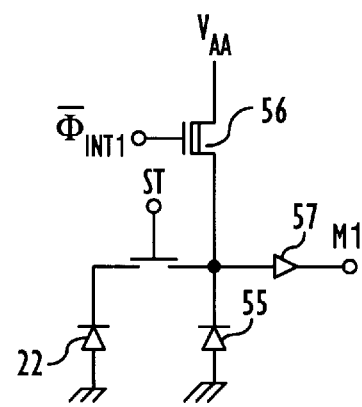
FIG. 14B is a sectional view of a monitor light receiving portion.

FIG. 14B shows an embodiment of the monitor light receiving element, in which the monitor light receiving portion 22 is connected to the floating diffusion portion 55 through the gate ST. The floating diffusion portion 55 is connected to the source of a N-channel depression FET 56 and a buffer 57. The gate and drain of the N-channel depression FET 56 are connected to the integral control gate $\overline{\Phi}_{INT1}$ and the power source VAA, respectively.

When the gate $\overline{\Phi}_{INT1}$ is "H", the floating diffusion portion 55 is reset to be connected to the power source VAA, so that the voltage is output as a monitor output from the monitor terminal M1 through the buffer.

When the gate $\overline{\Phi}_{INT1}$ is "L", the N-channel depression FET 56 is made OFF, so that the electric charge produced by the monitor light receiving portion 22 is moved into the floating diffusion portion 55 through the gate ST. Since the output of the monitor terminal M1 decreases in accordance with the quantity of integration of the charge, the quantity of integration of the charge can be detected by monitoring the output of the monitor terminal M1 into the control circuit.

Figure 11B:
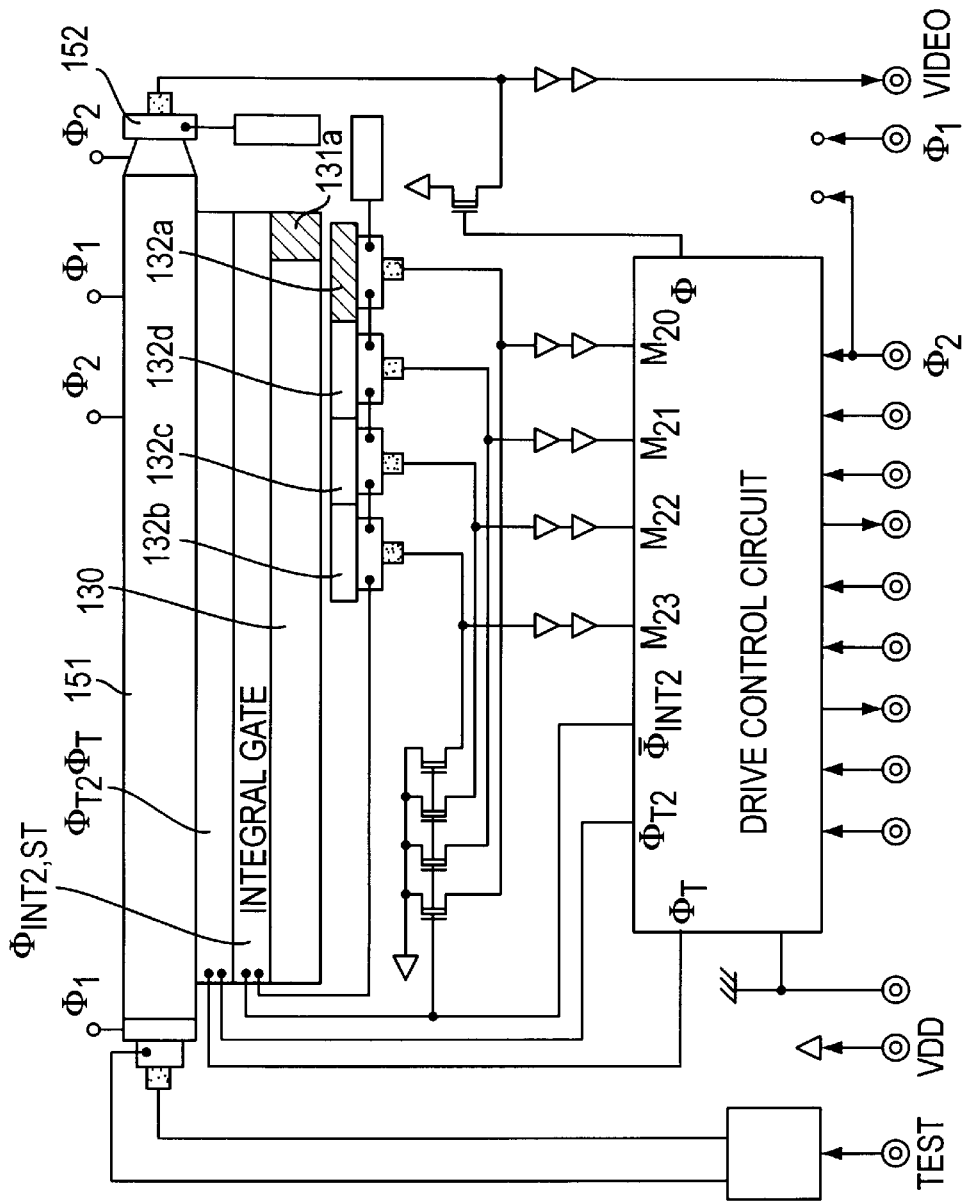
FIG. 11B is a front elevational view of a CCD image sensor for an object distance measuring zone according to an embodiment of the present invention.

The above dicussion has been directed to an image sensor for a focus detecting device having three measuring zones. However, the image sensor according to the present invention can be applied to focus detecting apparatus having a single measuring zone. In this alternative, as shown in FIG. 11B which shows an image sensor corresponding to the first object distance measuring sensor shown in FIG. 11A, monitor sensor light receiving portions 132a, 132b, 132c and 132d are provided adjacent to the CCD image sensor 130. The transfer gate 151 is provided on the side opposite to the monitor light receiving portions. Between the CCD image sensor 130 and the transfer gate 151 are provided integral control gate $\overline{\Phi}_{INT1}$, integral gate ST, charge holding gate $\Phi_{T2}$ and shift gate $\Phi_T$. The transfer gates $\Phi_1$ and $\Phi_2$ are provided above the transfer gate 151. The transfer gate 150 has at its terminal end an output portion 152, so that the signal charges produced by the CCD image sensor 130 are successively output as video signals. The operations of the above mentioned various components are similar to those of the object distance measuring sensor shown in FIG. 11A.

Drive Control Circuit of Object Distance Measuring Sensor

The drive control circuit of the object distance measuring sensor will be explained below with reference to FIG. 15A.

The oscillator 60 generates a clock pulse of X Hz for operating the CCD image sensors 20, 30 and 40. It is possible to use a clock of the micro computer in place of the oscillator 60.

The oscillator 60 also generates a clock pulse of ¼ Hz which is inputted to a 4-bit counter 61. Clock terminals $\Phi_8$, $\Phi_{16}$, $\Phi_{32}$ and $\Phi_{64}$ of the 4-bit counter 61 output clock pulses of $\frac{1}{8}$X H$_z$, $\frac{1}{16}$X H$_z$, $\frac{1}{3}$X H$_z$ and $\frac{1}{64}$X H$_z$, respectively (FIG. 16).

The clock terminal $\Phi_8$ is connected to one input terminal of AND gate 66, C terminal of D flip-flop 73 and a third input terminal of three flip-flop circuits A1, A2 and A3.

The clock terminal $\Phi_{16}$ is connected to one input terminal of AND gates 66 and 68. Each of the AND gates 66 and 68 have four input terminals.

The clock terminal $\Phi_{32}$ is connected to one input terminal of the AND gate 66 and the AND gate 68 through an inverter 67. The clock terminal $\Phi_{64}$ is connected to one input terminal of the AND gates 66 and 68, and is also connected to gates $\Phi_1$ and $\Phi_2$ through a buffer 62 and an inverter 63 and buffer 64, respectively. Therefore, the level of the gate $\Phi_1$ is identical to the level of the clock terminal $\Phi_{64}$, and the level of the gate $\Phi_2$ is opposite to the level of the gate $\Phi_1$. Namely, when the gate $\Phi_2$ is "L", the gate $\Phi_1$ is "H" and vice versa (FIG. 16).

The output terminal of the AND gate 66 is connected to the gate $\Phi_R$, so that the level of the gate $\Phi_R$ becomes "H" when the clock terminal $\Phi_8$ is "L" and the other clock terminals $\Phi_{16}$, $\Phi_{32}$ and $\Phi_{64}$ are "H" and vice versa.

The output level of the AND gate 68 becomes "H" when the clock terminals $\Phi_{16}$ and $\Phi_{64}$ are "H" and the other clock terminal $\Phi_{32}$ is "H" and vice versa.

The output terminal of the AND gate 68 is connected to a terminal C of a front stage D flip-flop 69 and to a terminal C of a rear stage D flip-flop 70 through an inverter 72.

The power source voltage VAA is applied to terminals D of the D flip-flop's 69 and 70. Terminals R of the D flip-flop's 69 and 70 are connected to the output terminal $\overline{\Phi}_{TP}$ of the micro computer. Terminal Q of the front stage D flip-flop 69 is connected to one of the input terminals of the AND gate 71. Terminal Q of the rear stage D flip-flop 70 is connected to the other input terminal of the AND gate 71. The output terminal of the AND gate 71 is connected to the gate $\Phi_T$. The level of the output terminal $\overline{\Phi}_{TP}$ is controlled by the micro computer.

The operation of the D flip-flop's 69 and 70 and the level change of the gate $\Phi_T$ will be explained below.

The terminals Q, Q of the D flip-flop's 69 and 70 are "L" and "H" when the output terminal $\overline{\Phi}_{TP}$ is "H", namely when the level of the terminal R is "H", respectively. Accordingly, the gate $\Phi_T$ is "L".

When the output terminal $\overline{\Phi}_{TP}$ is "L", namely when the level of the terminal R is "L", the level of the terminal Q of the front stage D flip-flop 69 becomes "H", in accordance with a raise of the output of the terminal C, i.e. as the output of the AND gate 68 changes from "L" to "H". On the other hand, the level of the terminal Q of the rear stage D flip-flop 70 becomes "L", in accordance with a descent of the output of the terminal C, i.e. as the output of the AND gate 68 changes from "H" to "L". Consequently, since both terminals Q, Q are "H" before the output of the AND gate 68 begins descending, the output of the AND gate 71 and accordingly the gate $\Phi_T$ is "H". After that, when the terminal Q of the flip-flop 70 becomes "L", the gate $\Phi_T$ becomes "L".

Power source voltage VAA is applied to terminal D of the D flip-flop 73. Terminals C, R and Q of the D flip-flop 73 are connected to the clock terminal $\Phi_8$, an output terminal $\overline{\Phi}_{START}$ of the micro computer and input terminals of NAND gates 74, 75 and 76, respectively. The terminal Q is always "L" when the output terminal $\overline{\Phi}_{START}$ is "H". Terminals Q becomes "H" when the output terminal $\overline{\Phi}_{START}$ is "L". The level of the output terminal $\overline{\Phi}_{START}$ is controlled by the micro computer.

The other input terminals of the NAND gates 74, 75 and 76 are connected to one of the input terminals of an OR gate 91, and ones of the output terminals of the flip-flop circuits A1, A2 and A3, respectively. The output terminals of the NAND gates 74, 75 and 76 are connected to the gates $\overline{\Phi}_{INT1}$, $\overline{\Phi}_{INT2}$ and $\overline{\Phi}_{INT3}$, respectively. OR gate 91 is connected at its output terminal to the input terminal $\Phi_{TM}$ of the micro computer.

Flip-flop circuit A1 has three-stage D flip-flops 87, 88 and 89 and an AND gate 90 to form a delay circuit having three inputs and two outputs.

The first input forms a first clock input which is connected to a terminal C of the front stage D flip-flop 87, and the intermediate input forms a reset input which is connected to the terminals R of the D flip-flop's 87, 88 and 89. The third input of the delay circuit forms a center clock input which is connected to the terminals C of the intermediate stage flip-flop 88 and the rear stage flip-flop 89. One of output terminals of the delay circuit is connected to the terminal Q of the rear stage flip-flop 89 and the other output terminal is connected to the output of the AND gate 90.

The first clock input is connected to the output of the NAND gate 84. The reset input is connected to the output terminal $\overline{\Phi}_{START}$, and the center clock input is connected to the clock terminal $\Phi_8$.

The power source voltage VAA is applied to the terminal D of the front stage D flip-flop 87. The terminal Q of the front stage flip-flop 87 is connected to the terminal D of the intermediate stage D flip-flop 88. The terminal Q of the intermediate stage D flip-flop 88 is connected to the terminal D of the rear stage D flip-flop 89 and one of the input terminals of the AND gate 90.

Terminal Q of the rear stage D flip-flop 89 is connected to the other input terminal of the AND gate 90, an input terminal $\Phi_{T1M}$ of the micro computer (which is one of the outputs of the flip-flop circuit A1) and one of the inputs of the OR gate 91, NAND gate 74.

The output of the AND gate 90 forms the other output of the flip-flop circuit A1, connected to the gate $\Phi_{T1}$.

The internal constructions of the flip-flop circuits A2 and A3 are similar to that of the flip-flop circuit A1. The connection of the reset terminals and the center clock inputs of the flip-flop circuits A2 and A3 are similar to that of the flip-flop circuit A1.

Note that the first clock inputs of the flip-flop circuits A2 and A3 are connected to the outputs of the OR gates 85 and 86, respectively. One of the outputs of the flip-flop A2 is connected to an input terminal $\Phi_{T2M}$ of the micro computer, one of the input terminals of the OR gate 91 and the other input terminal of the NAND gate 75. The other output of the flip-flop A2 is connected to the gate $\Phi_{T2}$.

One of the outputs of the flip-flop A3 is connected to an input terminal $\Phi_{T3M}$ of the micro computer, one of the input terminals of the OR gate 91 and the other input terminal of the NAND gate 76. The other output of the flip-flop A3 is connected to the gate $\Phi_{T3}$.

The OR gates 84, 85 and 86 are connected at their output terminal to the output terminal $\Phi_{STOP}$ of the micro computer. Accordingly, the outputs of the OR gates 84, 85 and 86 are "H" when the output terminal $\Phi_{STOP}$ is "H". The output terminal $\Phi_{STOP}$ forms a terminal which forcedly stops the integration of the CCD image sensors 20, 30 and 40 and which becomes "H" after a lapse of a predetermined time of integration.

The other input terminals of the OR gates 84 and 86 are connected to the output terminals of the comparators 78 and 82. The other input terminal of the OR gate 85 is connected to the output terminal of the OR gate 83.

Inverter input terminal of comparators 78 and 82 are connected to monitor output terminals M1 and M3, non-inverter input terminal is connected to the monitor reference voltage Vref. The comparators 78 and 82 outputs are "H" when the level of the monitor output terminals M1 and M3 are identical to the monitor reference voltage Vref. When the output of the comparators 78 and 82 are "H", the output of the OR gates 84 and 88 are "H".

The monitor output terminals M1 and M3 output the integral value of the monitor input portions 22 and 42. The monitor reference voltage Vref is a reference value at which the integration is stopped and can be controlled by the micro computer to be selectively a standard, about half the standard, and about one fourth the standard.

The OR gate 83 has three input terminals connected to the output terminals of the comparators 79, 80 and 81, respectively. The inverter input terminals of the comparators 79, 80 and 81 are connected to the monitor output terminals M21, M22 and M23. The monitor reference voltage Vref is applied to the non-inverter input terminals of the comparators. Therefore, when the level of one of the monitor output terminals M21, M22 and M23 is identical to the monitor reference voltage Vref, the comparator 79, 80 or 81 which is connected to the associated monitor output terminal becomes "H", and the outputs of the OR gates 83 and 85 become "H".

Note that if the monitor light receiving portions 32 and 34 are formed by four pieces similar to the monitor light receiving portion 22, the circuits bewteen the monitor output terminal M1 and the OR gate 84 and between the monitor output terminal M3 and the OR gate 86 are similar to that between the monitor output terminal M2 and the OR gate 85.

Figure 15B:
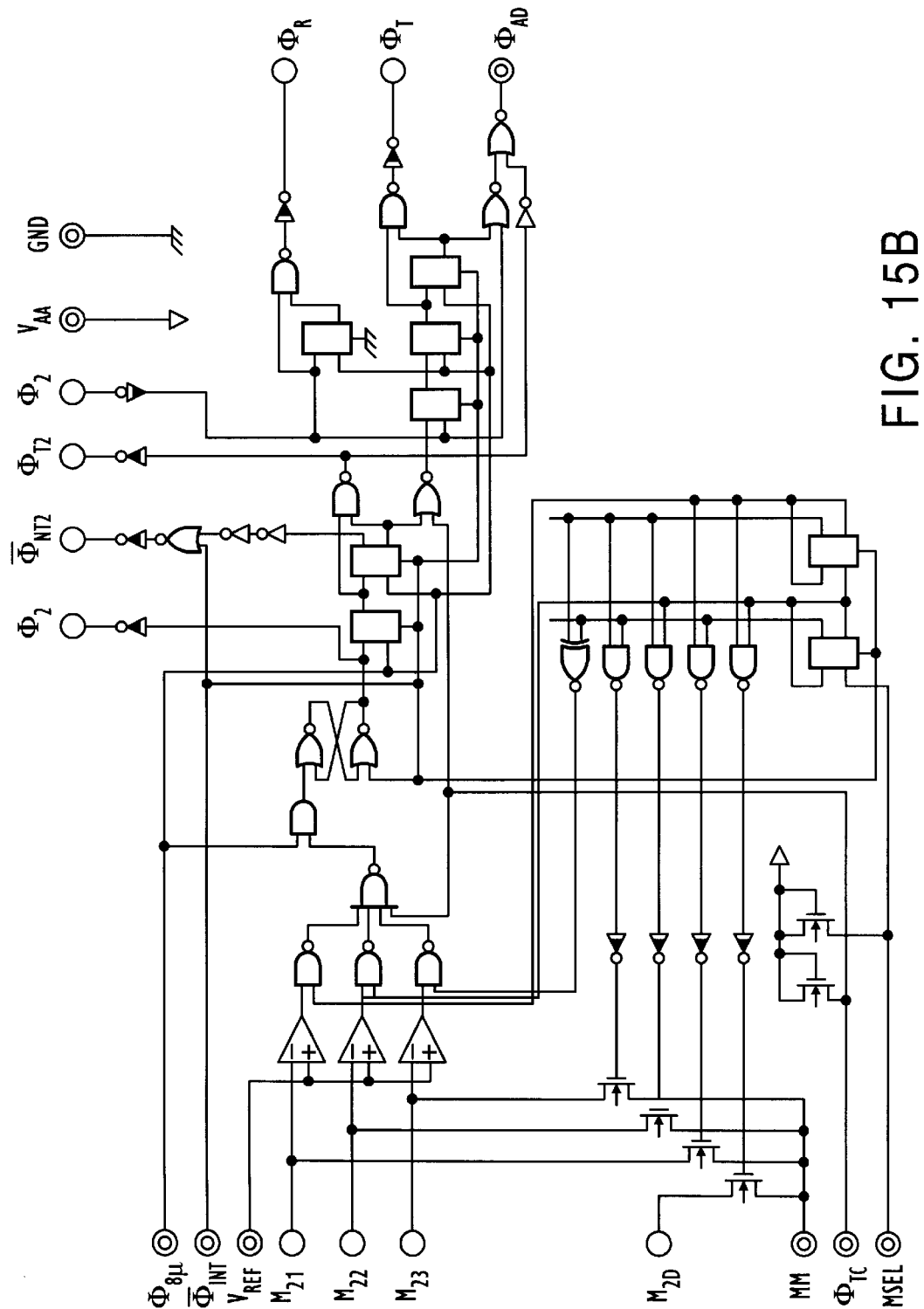
FIG. 15B is a diagram showing a driving control circuit of a CCD image sensor shown in FIG. 11B.

FIG. 15B shows a drive control circuit of a single object distance measuring sensor shown in FIG. 11B. If any one of the monitor terminals M21, M22 and M23 exceeds a reference voltage Vref, the integral gate $\Phi_{T2}$ is turned from "H" to "L" to complete the integral operation. The basic operation of the arrangement shown in FIG. 15B is similar to that shown in FIG. 15A.

Integral Circuit

The integral operation of the CCD image sensors will be explained below with reference to FIGS. 12, 15 and 16.

At the stop of integration, the output terminal $\overline{\Phi}_{START}$ is "H". In this state, since the terminal Q of the D flip-flop 73 is "L", the outputs of the NAND gates 74~76, (i.e. the integral control gates $\overline{\Phi}_{INT1}$) $\overline{\Phi}_{INT2}$ and $\overline{\Phi}_{INT3}$ are "H", so that no integration is performed, as shown in FIG. 13(C).

The reset input of the flip-flop circuit A1 is "H". Therefore, since the output of the terminal Q-of the rear stage flip-flop 89 is "H" and the output of the intermediate stage flip-flop 88 is "L", the output of the AND gate 90 is "L". Namely, one of the outputs of the flip-flop circuit A1 is "H" and the other output is "L". Consequently, the input terminal $\Phi_{T1M}$ is "H" and the gate $\Phi_{T1}$ is "L".

The operation of the flip-flop circuits A2 and A3 is similar to the flip-flop circuit A1, so that the gates $\Phi_{T2}$ and $\Phi_{T3}$ are "L" and the input terminals $\Phi_{T2M}$ and $\Phi_{T3M}$ are "H".

At the commencement of integration, the output terminal $\overline{\Phi}_{START}$ turns to "L". As a result, the terminal R of the D flip-flop 73 is "L", and accordingly the terminal Q of the D flip-flop 73 becomes "H" in accordance with a raise of the output of the terminal C and the-signal "H" is latched. Conxequently, one of the inputs of the NAND gates 74~76 becomes "H".

Since the reset input of the flip-flop circuit A1 becomes "L", when the OR gate 84 becomes "H", the terminal Q of the front stage D flip-flop circuit 87 becomes "H" in accordance therewith. However, the output of the OR gate 84 is maintained "L", until the output of the monitor light receiving portion 22 reaches the monitor reference voltage Vref or the output terminal $\Phi_{STOP}$ becomes "H".

Accordingly, the terminals Q of the front stage D flip-flop 87 and the intermediate D flip-flop are maintained "L" without change, and the terminal Q-of the rear stage D flip-flop 89 is maintained "H" without change. Namely, the outputs of the flip-flop circuit A1 are maintained to be same as the value before the integration, that is, the input terminal $\Phi_{T1M}$ is "H" and the gate $\Phi_{T1}$ is "L", and accordingly the other inputs of the NAND gates 74 to 76 are maintained "H".

Consequently, the inputs of the NAND gate 74 become "H", so that the integral control gate $\overline{\Phi}_{INT1}$ connected to the output terminal of the NAND gate 74 becomes "L". As a result, the integration of the CCD image sensor 20 and the integration of the monitor light receiving portion 22 are commenced (FIG. 12 and FIG. 13(C)).

Since the flip-flop circuits A2 and A3 operate similarly to the flip-flop circuit A1, the gates $\overline{\Phi}_{INT2}$ and $\overline{\Phi}_{INT3}$ become "L", so that the intagration of the CCD image sensors 30 and 40 and the integration of the monitor input portions 32 and 42 are commenced.

When the integration level of the monitor terminal M1 becomes the monitor reference voltage Vref, the output of the comparator 78 becomes "H", and the output of the OR gate 84 turns to "H". Since the first clock input of the flip-flop circuit A1 is turned to "H", the terminal Q of the front stage D flip-flop 87 becomes "H" in accordance with a raise of the first clock input, and the terminal D of the intermediate flip-flop 88 becomes "H". Accordingly, the terminal Q of the intermediate flip-flop 88 is turned to "H" in accordance with a raise of the intermediate clock input (the clock terminal $\Phi_8$, so that one of the inputs of the AND gate 90 becomes "H".

The terminal D of the rear stage D flip-flop 89 is turned "H" at the same time when one of the inputs of the AND gate 90 becomes "H". After that, when the terminal C is turned from "L" to "H", terminal Q-of the rear stage D flip-flop becomes "L" in accordance therewith. Namely, the inputs of the AND gate 90 become "H", during a period of one cycle of the clock signal $\Phi_8$, and the other input is then turned to "L".

As a result, the other output of the flip-flop circuit A1, i.e. the gate $\Phi_{T1}$ is turned to "H" during a period of one cycle of the clock terminal $\Phi_8$, and is then returned to "L". Thus, the signal charges integrated at the gate ST are transferred to the gate $\Phi_{T1}$ to complete the integral operation, when the gate $\Phi_{T1}$ is "H" between the times t2 and t3, as shown in FIG. 12(C).

When gate $\Phi_{T1}$ is returned to "L" (at t3), the electric charge is confined and temporarily held in the gate $\Phi_{T1}$ (strictly speaking, the portion under the gate), as shown in FIG. 12(D).

The terminal Q-of the rear stage D flip-flop 89, i.e. one of the outputs of the flip-flop circuit A1, becomes "L". As a result, the other input of the NAND gate 74 is "L", so that the output thereof, i.e., the integral control gate $\overline{\Phi}_{INT1}$, is "H", and accordingly no integration is performed, as shown in FIG. 13(C).

In summary, when the monitor terminal M1 is identical to the monitor reference voltage Vref, the gate $\Phi_{T1}$ is turned to "H" to transfer the integrated electric charge and is then returned to "L" to hold the charge. The integral control gate $\overline{\Phi}_{INT1}$ is turned to "H" to stop the integration in a hard ware.

By the operations mentioned above, in the case of an object having high brightness, the integral operation is stopped at any time when one of the monitor terminals reaches the monitor reference voltage, before a predetermined period of time lapses, so that no saturation of the integral values (accumulated charges) occurs.

The flip-flop circuits A2 and A3 operates similar to the flip-flop circuit A1. The integral control gates $\overline{\Phi}_{INT2}$ and $\overline{\Phi}_{INT3}$ and the gates $\Phi_{T2}$ and $\Phi_{T3}$ change similar to the integral control gate $\overline{\Phi}_{INT1}$ and the gate $\Phi_{T1}$ mentioned above. The center flip-flop circuit A2 stops the integration as soon as one of the three monitor terminals M21, M22 and M23 reaches the monitor reference voltage Vref, since the outputs of the OR gates 83 and 85 are "H".

The micro computer detects the completion of the integration when the levels of the input terminals $\Phi_{T1M}$, $\Phi_{T2M}$ and $\Phi_{T3M}$ are turned from "H" to "L".

When the micro computer detects that the integration processes of all of the CCD image sensors 20, 30 and 40 are completed (i.e. that all the electric charges of the store gate ST are transferred to the gates $\Phi_{T1}$, $\Phi_{T2}$ and $\Phi_{T3}$) in accordance with the change in level of the terminals $\Phi_{T1M}$, $\Phi_{T2M}$ and $\Phi_{T3M}$, the micro computer turns the terminal $\Phi_{TP}$ and accordingly the terminals R of the D flip-flops 69 and 70 to "L". Consequently, the terminal Q-of the front stage D flip-flop 69 (one of the input terminals of the AND gate 71) becomes "H" when the output of the AND gate 68 changes from "L" to "H".

The terminal Q-of the rear stage D flip-flop (the other terminal of the AND gate 71) is turned to "L" when the output of the AND gate 68 is changed from "L" to "H". Since the inputs of the AND gate 71 are "H" between the time t4 at which the output of the AND gate 68 is raised and the time t5 at which the output descends, the output of the AND gate 71, i.e. the gate $\Phi_T$ becomes "H", so that the charges temporarily held by the charge holding gates $\Phi_{T1}$, $\Phi_{T2}$ and $\Phi_{T3}$ are moved to the portion of the integrated circuit board under the gate $\Phi_{CCD}$ (transfer register 51).

After that, when the output of the AND gate 68 is turned to "L", the gate $\Phi_T$ is returned to "L", and accordingly, the charges moved to the gate $\Phi_{CCD}$ are confined in the transfer register 51.

The charges in the transfer register 51 are then transferred to the CCD output portion 52 by the two-phase clock supplied to the transfer gates $\Phi_1$ and $\Phi_2$. After that, the signal charges are output therefrom as video signals.

Since the signal charges thus integrated are temporarily held in the portions of the integrated circuit board under the charge holding gates $\Phi_{T1}$, $\Phi_{T2}$ and $\Phi_{T3}$, the signal charges can be transferred to the transfer register 51 at an optional timing. Namely, the pulses can be periodically supplied to the transfer gate $\Phi_1$ and $\Phi_2$ and the gate $\Phi_{CCD}$ independently of the integration time, resulting in a compact and simple circuit construction.

Video Signal Processing Circuit

Figure 17:
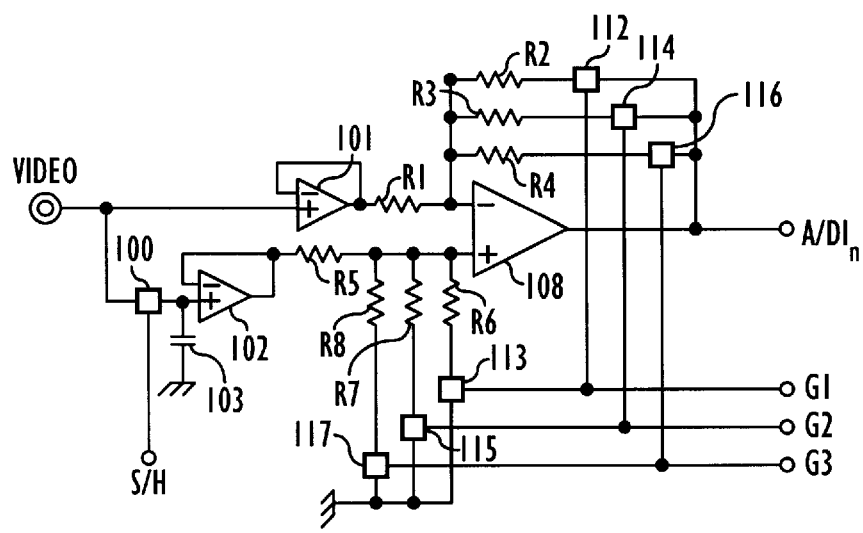
FIG. 17 is a diagram of a video signal processing circuit.

The processing circuit of the video signal which is output from the transfer register 51 will be explained below with reference to FIG. 17.

The signal charges transferred from the CCD image sensors 20, 30 and 40 to the transfer register 51 are successively transferred to the CCD output portion 52 by the two-phase clock applied to the transfer gates $\Phi_1$ and $\Phi_2$. The transfer operation perse is well known and accordingly no detailed explanation therefor is given herein.

The signal charges accumulated by the CCD image sensors 40, 30 and 20 are successively outputted in this order from the CCD output portion 52 to the Video terminal as video signals. The video signal which is first outputted to the Video terminal is a signal of the intercepted photoelectric converting element 41a of the CCD image sensor 40, i.e. a dark current component of the photoelectric converting element 41a.

The video terminal is connected to a MOS switching element 100 and a non-inverting input terminal of an operational amplifier 101.

The output is fed back to the non-inverting input terminal of the operational amplifier 101. The output terminal of the operation amplifier 101 is connected to an inverting input terminal of a differential amplifier 118 through a resistor R1. The output of the differential amplifier 118 is connected to an A/D converter through a terminal A/DIN. The intermediate portion between the resistor R1 and the inverter input terminal of the differential amplifier 118 is connected to MOS switching elements 112, 114 and 116 through resistors R2, R3 and R4. The input terminals of the MOS switching elements 112, 114 and 116 are connected to the output terminal of the differential amplifier 118.

A control terminal of the MOS switching element 100 is connected to a S/H terminal. The output of the MOS switching element 100 is connected to a non-inverting input terminal of the operational amplifier 102. A capacitor 103 is provided between a line connecting the output of the MOS switching element 100 and the non-inverting input of the operational amplifier 102 and the ground. The capacitor 103 stores the output voltage corresponding to the electric charges of the photoelectric converting element 41a.

The output of the operational amplifier 102 is fed back to the inverting input thereof. The output of the operation amplifier 102 is connected to the non-inverting input terminal of the differential amplifier 118 through a resistor R5. Between the resistor R5 and the non-inverting input of the differential amplifier 118 are connected the MOS switching element 113 through a resistor R6, the MOS switching element 115 through a resistor R7, and the MOS switching element 117 through a resistor R8, respectively.

The input terminals of the MOS switching elements 113, 115 and 117 are grounded at GND and the output terminals thereof are connected to the control terminals of the MOS switching elements 112, 114 and 116 and the terminals G1, G2 and G3, respectively.

The terminals G1, G2 and G3 are connected to the micro computer and can be selectively used to control three stages of the gain of the differential amplifier 118. The resistance ratio of the resistors R2, R3 and R4 is 1:2:4, and the resistance ratio of the resistors R6, R7 and R8 is 1:2:4. Supposing that the gain when the terminal G1 is selected is 1, the gain when terminals G2 and G3 are selected are 2 and 4, respectively.

The video processing circuit operates as follows.

A reference video signal is issued from the intercepted photoelectric converting element 41a of the third image sensor 40 to be inputted into the Video terminal. Synchronously with the inputting of the reference video signal due to the dark current, the micro computer outputs a sample hold pulse "H" to the S/H terminal, and accordingly, the reference video signal is stored (accumulated) in the capacitor 103 through the MOS switching element 100 and is input into the non-inverting input terminal of the operational amplifier 102. The operational amplifier 102 forms a buffer, so that the stored voltage of the capacitor 103 is buffer-output. The output of the operational amplifier 102 is supplied to the non-inverting input terminal of the differential amplifier 118 through the resistor R6. After the reference video signal is input, since the sample hold pulse "L" is output to the S/H terminal, the storage of the reference video signal in the capacitor 103 is maintained.

Supposing that the resistance value of the resistors R1 and R5 is Ra and the resistance value of the resistors R2 and R6 is Rb when the gate G1 is selected, respectively, the output voltage of the differential amplifier 118 is given by the following equation:

$$[(Rb/Ra) \times (\text{reference video signal} - \text{video signal})]$$

Similarly, supposing that the resistance value of the resistors R3 and R7 is 2Rb and the resistance value of the resistors R4 and R8 is 4Rb, a gain twice or three times the gain at the selection of the terminal G1 mentioned above can be obtained by selecting the terminal G2 or G3.

As a result, the amplified signal in which the reference video signal component is subtracted from the video input signal, i.e. the dark current and the level fluctuation is removed is obtained by the differential amplifier 118 and is supplied to the A/DIn terminal.

FIG. 18 shows a circuit which generates the monitor reference voltage Vref. The voltage of the light interception input portion 33a of the monitor input portion 33 is inputted to terminal M20 which is connected to a non-inverting input terminal of an operational amplifier 119. The output of the operational amplifier 119 is fed back to an inverting input terminal thereof. The output terminal of the operational amplifier 119 is connected to an output of a 6-bit A/D converter 121 through a resistor R9, so that the monitor reference voltage Vref is taken out from the connection of the resistor R9 and the output mentioned above.

The 6-bit A/D converter 121 is of a type in which the current is output. The monitor reference voltage Vref is given by the following equation:

$$M20 - Vref = e \times n \text{ (mV)}$$

wherein e=50 (mV), n=0~63

A predetermined 6-bit signal (n) is supplied to the input bits d1~d6 of the 6-bit A/D converter 121 from the micro computer. For instance, when "110000" is inputted, e×110000≈2.4 V is obtained. By comparing the monitor reference voltage Vref with the monitor outputs M1, M21, M22, M23 and M3, the dark current component and the direct current component are removed, so that accurate charges can be detected from the monitor light receiving portions 22, 32 and 42.

Camera System

Figure 19:
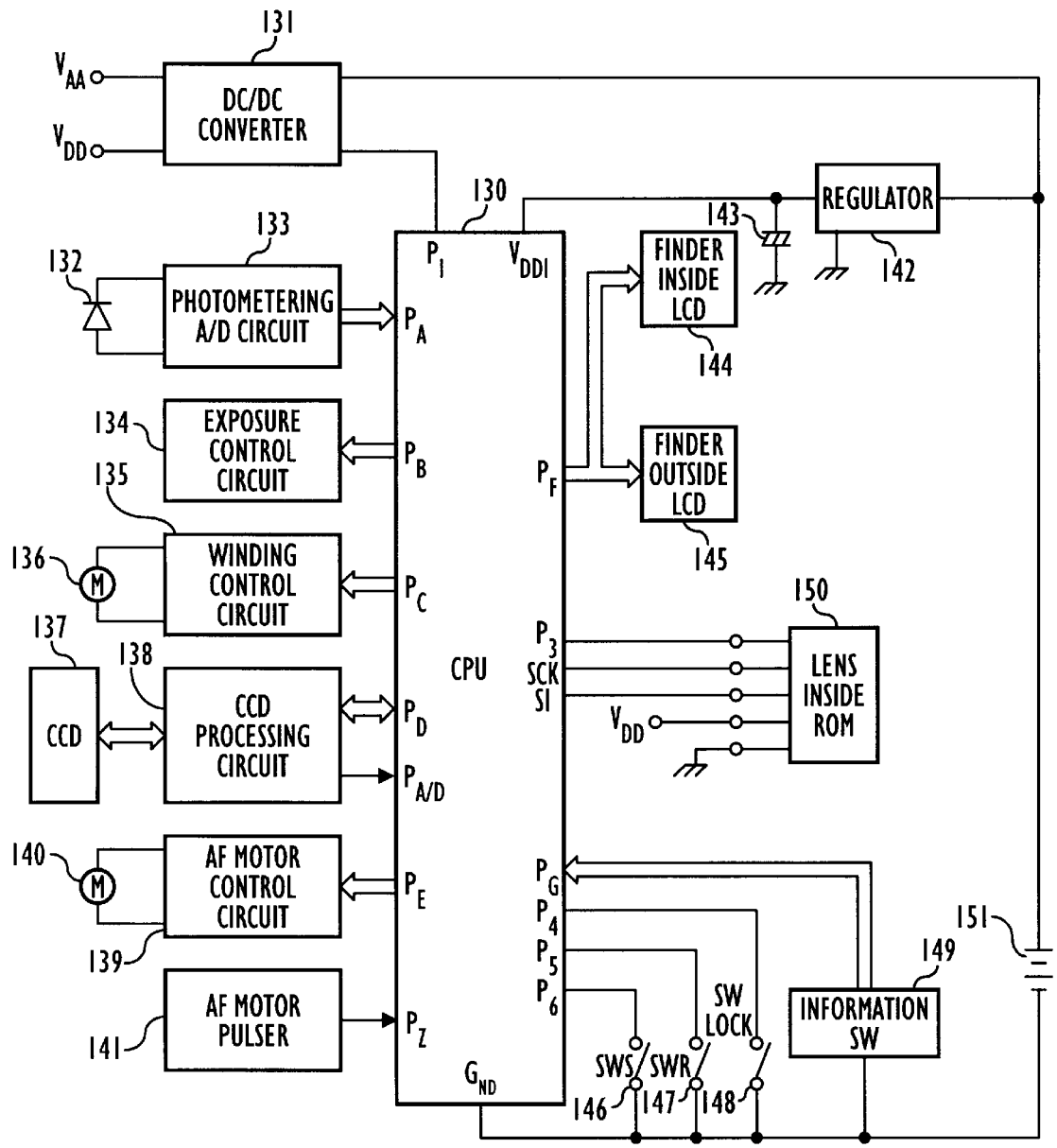
FIG. 19 is a system block diagram of an AF single-lens reflex camera to which the present invention is applied.

FIG. 19 shows a block diagram of a whole camera system. The CPU 130 functions as an object distance arithmetic means to control the whole system.

A power source voltage VDD1 is supplied to the CPU 130 through battery 151 and a regulator 142. The power source voltage VDD1 is backed-up by a very high valve capacitor 143 to prevent a fluctuation due to a quick decrease of voltage of the battery 151.

Port P1 of the CPU 130 is connected to a DC/DC converter 131. A plus terminal of the battery 151 is connected to the DC/DC converter 131. The DC/DC converter 131 outputs reference voltage VAA of the control circuit of the light receiving portions and the power source voltage VDD for a photometer circuit.

The CPU 130 is connected to a photometer A/D converter 133, an exposure control circuit 134, a winding control circuit 135, a CCD processing circuit 138, an AF motor control circuit 139, an AF motor pulser 141, a finder inside LCD 144, and a finder oudside LCD 145. A photometer switch 146, a release switch 147, a lock switch 148 and an information switch 149 are input to the CPU 130.

The photometer A/D converter circuit 133 logarithmically compresses the output of the photometer light receiving element 132 and converts the analogue signal to a digital signal to input the same to the CPU 130. The exposure control circuit 134 controls the exposure by a sequential control of a mirror and a shutter blade. The winding control circuit 135 drives a film winding motor 136 to wind a film when the film is loaded and when the exposure is finished and to rewind the film when the film is finished to be taken.

The CCD processing circuit 138 includes the light receiving portion control circuit, the video processing circuit and the generating circuit of the monitor reference voltage Vref to cause the light receiving portion 137 to commence the integration in order to make a video signal thereby to input the video signal into the CPU 130. The CPU 130 performs the arithmetic process, based on the video signal from the CCD processing circuit 138 to detect the defocus value and to detect the number of revolution (the number of pulses of the pulser 141 of the AF motor) and the direction of rotation, of the AF motor 140.

The AF motor control circuit 139 drives the AF motor 140 in accordance with the above-mentioned information of the number of revolution and the direction of rotation from the CPU 130 to drive the focusing lens in order to effect the focusing operation. The pulser 141 of the AF motor generates the pulses in accordance with the number of revolution of the AF motor 140 to input the same into the CPU 130.

The CPU 130 counts the number of the pulses produced by the pulser 141 of the AF motor to detect the number of revolution of the AF motor 140. When the number of pulses is a predetermined value, the CPU 130 supplies a stop signal to the AF motor control circuit 139 to stop the AF motor 140.

The finder inside LCD 144 indicates information on focus state, shutter speed and strobe. The finder outside LCD 145 indicates photographing information on shutter speed, strobe, photographing modes, automatic-focus mode, and the number of taken frames of a film, etc.

The photometer switch 146 and the release switch 147 are associated with a release button, so that when the release button is pushed down by a half step, the photometer switch 146 is made ON and when the release button is pushed down by a full step, the release switch 147 is made ON.

When the photometer switch 146 is made ON, the integration of the CCD 137, the necessary AF arithmetic process, the drive of the AF motor 140 and photometering process, etc. are performed.

When the release button 147 is turned ON, the exposure control circuit 134 operates under predetermined conditions to perform the release operation and the exposure control, so that when the exposure is finished, the film winding motor 136 is driven to wind the film.

When the lock switch 148 is turned OFF, even if the photometer switch 146 and the release switch 147 are turned ON, the ON signals are not received by the CPU 130, which intermittently operates to detect whether or not the lock switch 148 is turned ON.

When the lock switch 148 is turned ON, if the photometer switch 146 and the release switch 147 are also ON, the CPU 130 makes the P1 port "L" and actuates the DC/DC converter 131 to supply the electric power to the associated circuits.

Information switch 149 switches between the exposure modes, the AF modes, the release modes, and the ISO sensitivity etc. The exposure modes include program modes, diaphragm manual modes, shutter manual-auto modes, etc. The AF modes include a single AF mode in which the shutter can be actuated only when the lens is correctly focused, a servo AF mode in which the shutter can be actuated regardless of focusing, and a manual focus mode, etc. The release modes include a single release mode in which the shutter can be actuated only once under the condition where the release switch 147 is turned from OFF to ON, and a successive release mode in which the shutter can be continuously actuated so long as the release switch 147 is made ON.

The CPU 130 includes serial communication ports P3, SCK and SI for reading data of a lens inside ROM 150 provided in the lens port. P3 forms a reset terminal, so that it is reset at "H" and the reset is released at "L". Port SCK is a serial clock port and port SI is a serial data input port.

The communication between the CPU 130 and the lens inside ROM 150 is effected in such a way that when port P3 is "L", the serial clock is transferred to the lens inside ROM 150 from port SCK to activate the lens inside ROM 150 in order to output the ROM data to port S1.

The above discussion has been directed to an AF single-lens reflex camera to which the present invention is applied, by way of an example.

Operation Flow

The operation of the CPU 130 will be explained below with reference to FIGS. 20–24.

Figure 20:
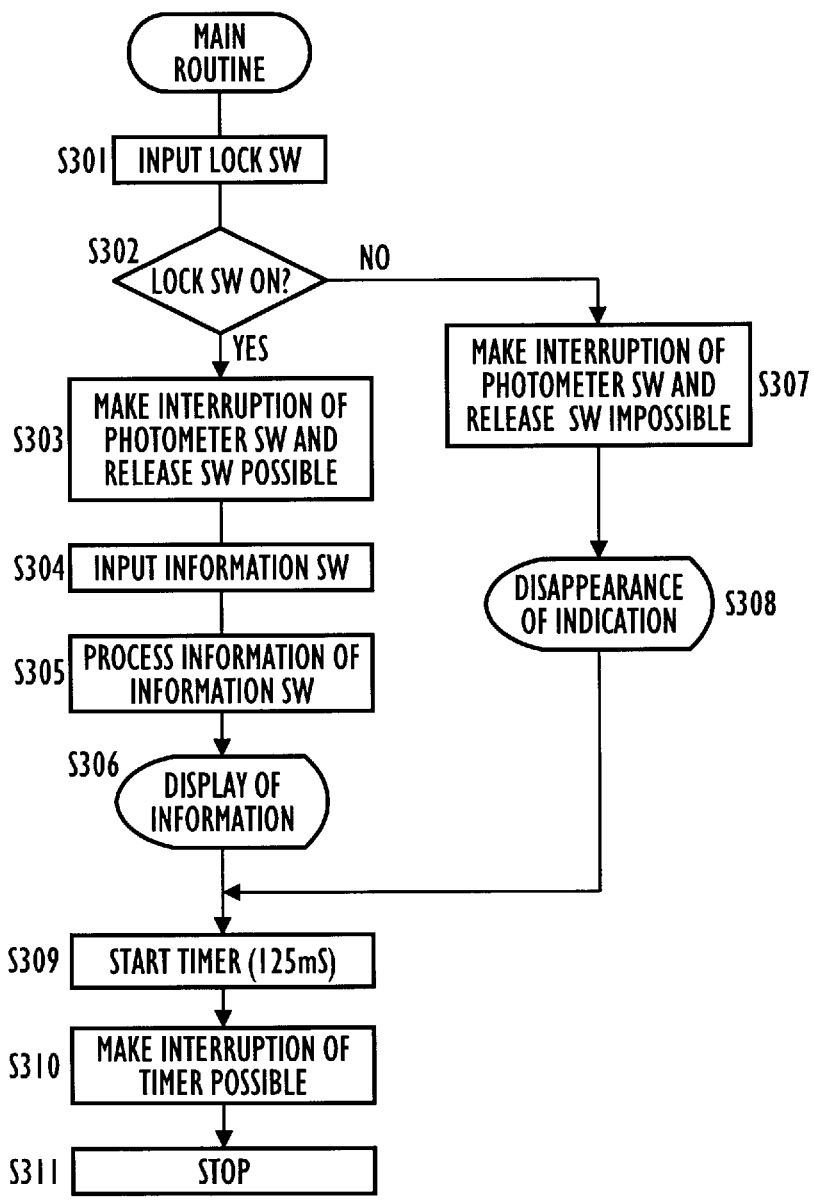

FIG. 20 shows a main flow chart of an AF single-lens reflex camera. When the battery 151 is loaded, the CPU 130 inputs and checks the lock switch 148 at steps S301 and S302. If the lock switch 148 is turned ON, the CPU 130 makes it possible to interrupt the control by the photometer switch 146 and the release switch 147 when they are ON (step S303) and inputs information of the information switch 149 (step S304). After that, the control proceeds to step S305 at which setting processes of the exposure mode, the AF mode and the release mode, etc. are performed in accordance with information inputted by the information switch 149. Memorizing processes of the set modes are also performed. After that, the set information are indicated in the finder inside LCD 144 and the finder outside LCD 145 (step S306).

If the lock switch 148 is OFF at step S302, control proceeds to step S307 at which no interruption of the photometer switch 146 and the release switch 147 can be permitted. The indication of the finder inside LCD 144 and the finder outside LCD 145 disappears (step S308).

After the indication process is performed at steps S306 or S308, a 125 mS interval timer is started (step S309), so that the processing can be interrupted by the timer (step S310). After that, control is stopped at step S311. The processes mentioned above are performed once every 125 mS. If the switch, such as the photometer switch 146 is turned ON, the following flow chart processsing is interrupted.

Figure 21:
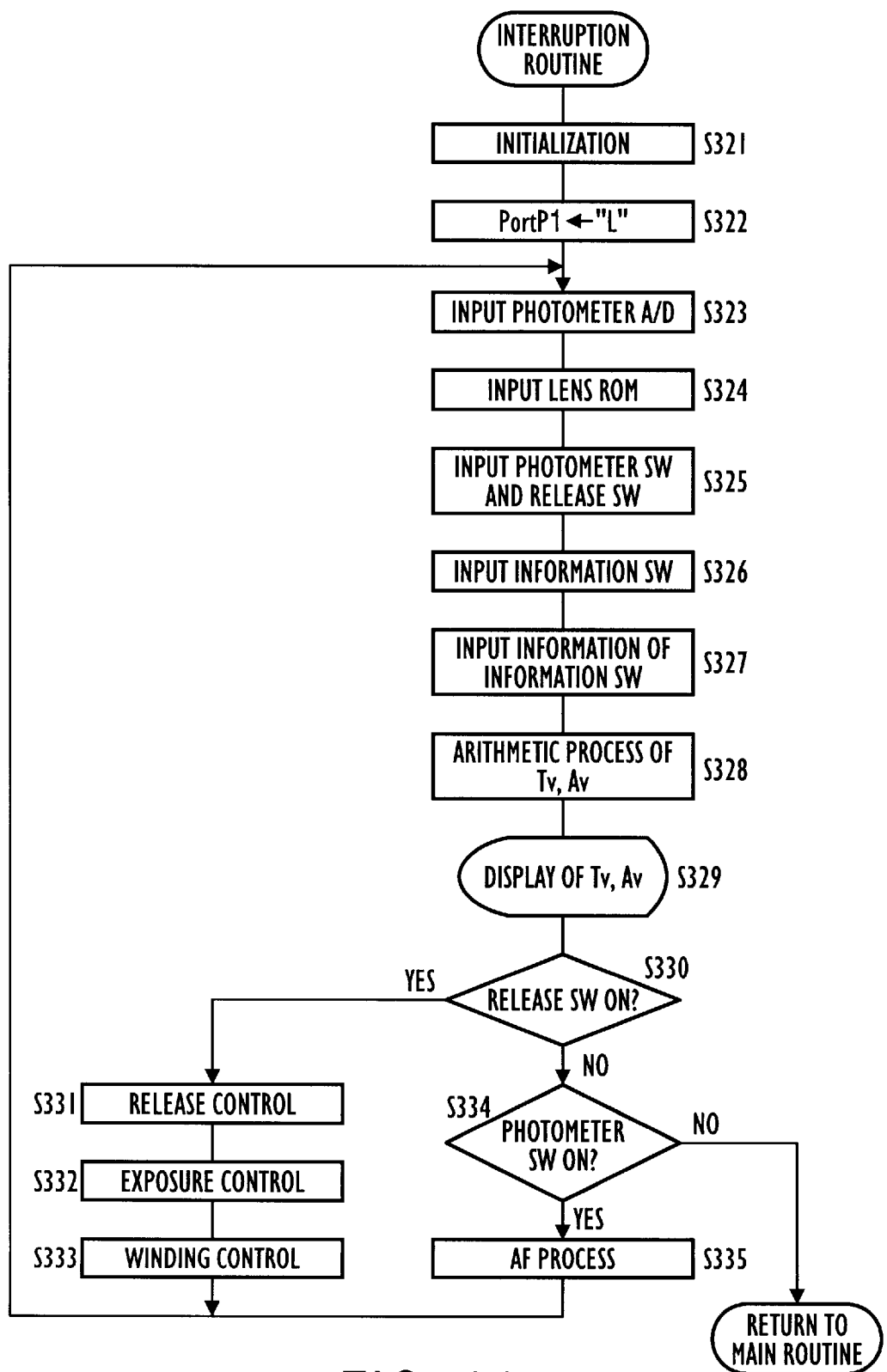

When the photometer switch 146 is turned ON, control proceeds to the routine shown in FIG. 21. In this routine, the conditions are initialized (step S321). For instance, a bit which shows whether or not the integration is performed is represented by "0", and a bit which shows whether or not the Af motor is driven is represented by "0", etc.

After that, at step S322, port P1 is made "L" to actuate the DC/DC converter 131 in order to supply power source voltage VAA and VDD to the various devices, so that the devices can be activated. Then, control proceeds to step S323.

At step S323, the brightness signal of the object issued from the light receiving element 132 is converted to a digital signal by the photometer A/D converter circuit 133, so that the digital brightness value is inputted (step S323). After that, at step S324, the lens information is inputted by serial communication with the lens inside ROM 150.

Hereafter, the input processes of the the photometer switch 146 and the release switch 147 are performed (step S325), the input process of the various information set by the information switch 149 and the setting process are performed (step S326), so that control proceeds to step S326. In the illustrated embodiment, it is assumed that the AF mode is selected to be the servo AF mode. The servo AF mode is a release priority mode in which the release can be effected when the release switch 147 is returned ON, regardless of focusing.

At step S328, the AE arithmetic process is performed, based on the brightness value (BV value), the ISO sensitivity and the exposure mode to obtain proper TV value and AV value necessary for the exposure control, so that the values are displayed in the finder inside LCD 144 and the finder outside LCD 145 (step S329).

When the arithmetic operation is finished, whether or not the release switch is turned ON is checked at step S330. If the release switch is turned ON, control proceeds to step S331, at which a release operation is effected. In particular, a release magnet is activated to disengage the mirror and the shutter blades and front and rear blade magnets are activated to magnetically engage the shutter blades. After that, a diaphragm magnet is activated to fix the aperture at a predetermined value in accordance with the AV value, and the power supply to the front blade magnet is released to give priority to the TE front blade. After the lapse of a predetermined period of time based on the TV value, the supply of the power to rear blade magnet is released to give a priority to the rear blade to expose the film (step S323).

After the exposure process is completed, the winding motor 136 is driven to effect the winding operation in which the film is wound and a mechanical charge of the mirror and the shutter is effected (step S333). After that, control is returned to step S323.

If the release switch 147 is OFF at step S330, control proceeds to step S 334 at which it is determined whether the photometer switch 146 is turned ON. If the photometer switch 146 is OFF, control jumps to the main routine. On the otherhand, if the photometer switch 146 is ON, control proceeds to an AF operation at step S335 to perform the AF process. After that, control is returned to step S323.

Figure 22A:
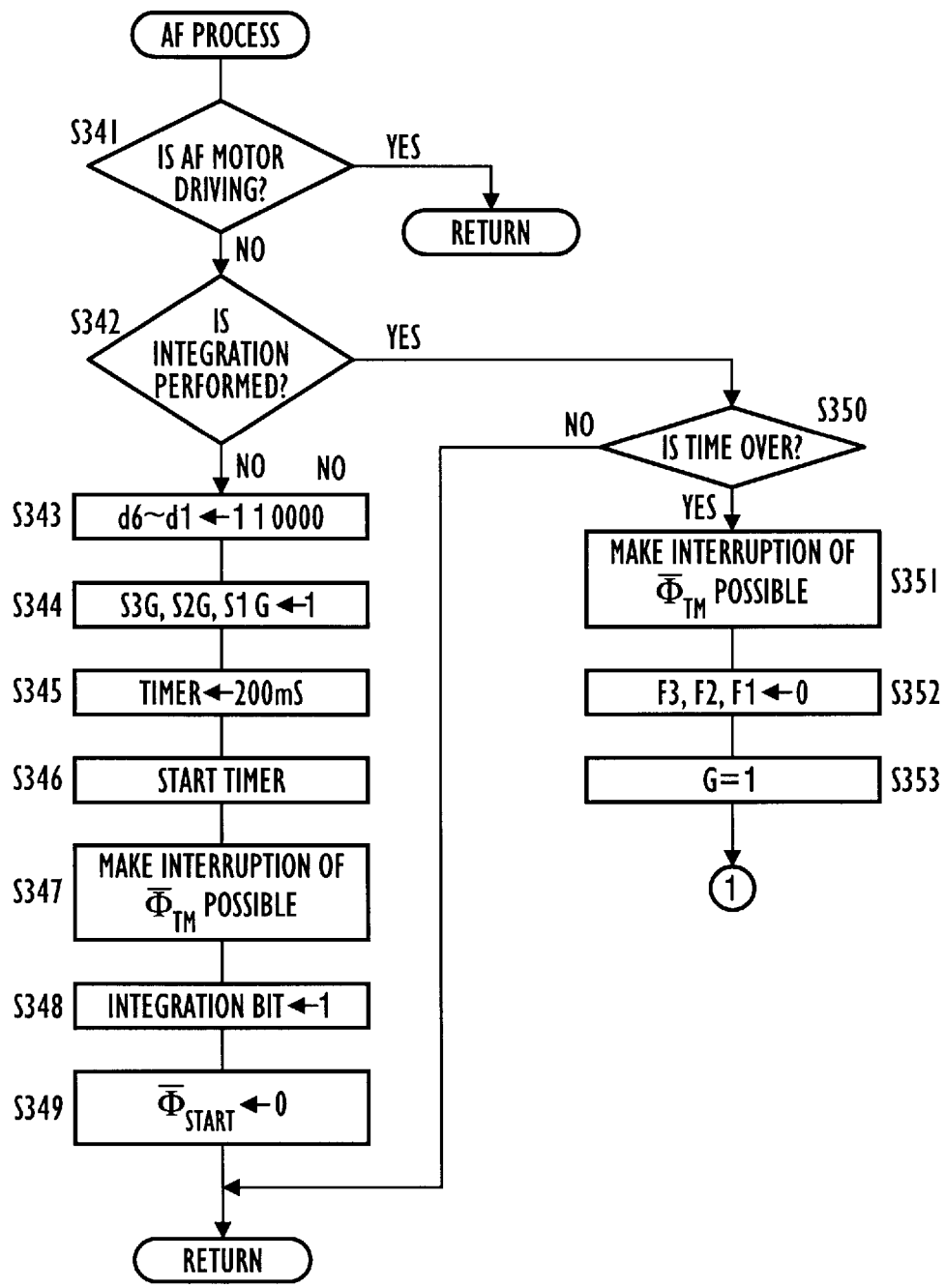
FIG. 22A and 22B are flow charts of the AF processing.
Figure 22B:
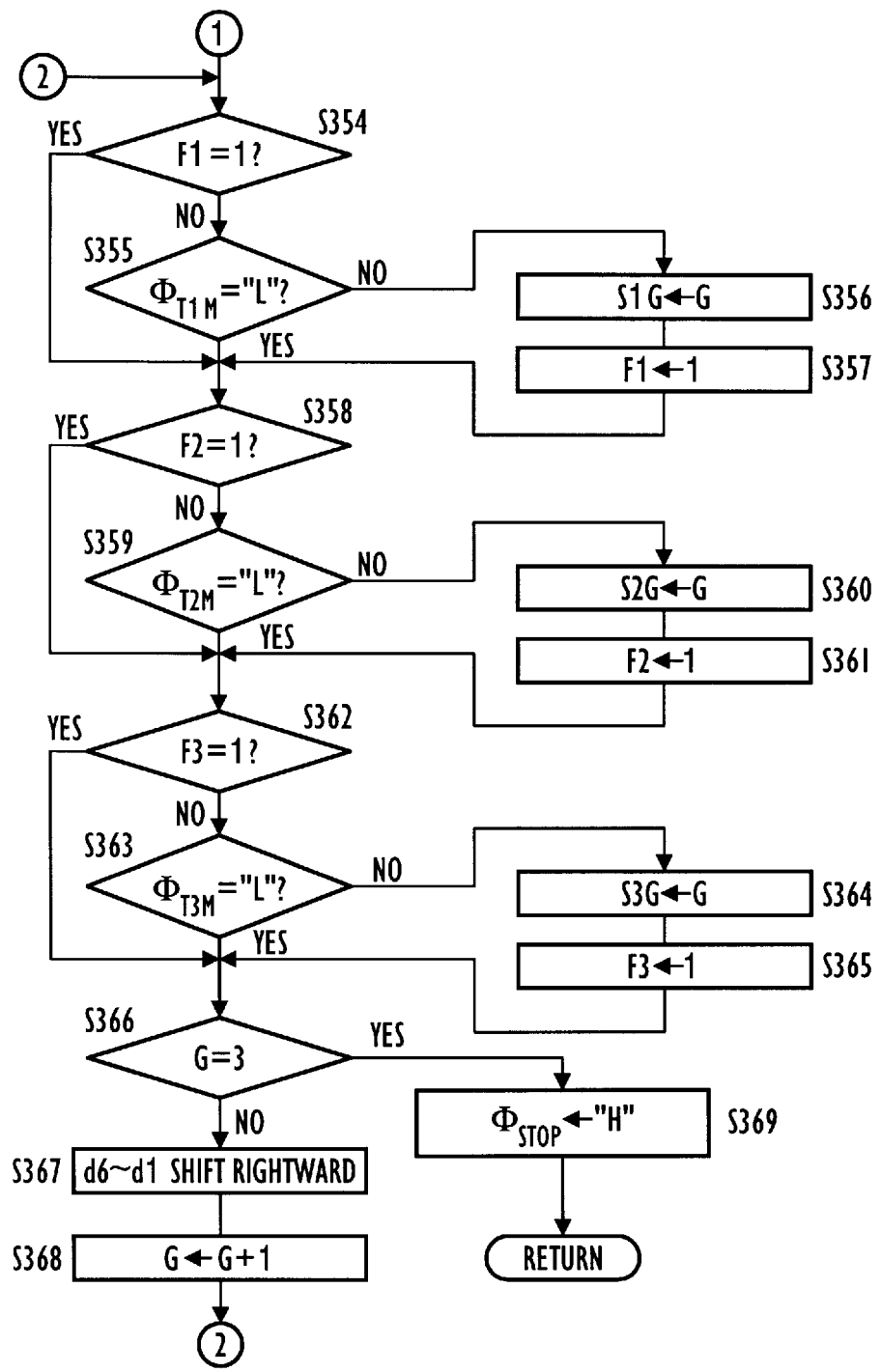

The following discussion will be directed to the AF process at step S335 (FIGS. 22A and 22B).

At step S341, whether the AF motor 140 is driven is checked; that is, whether or not the AF motor driving bit is "1" is checked. If the AF motor 140 is being driven (bit is "1"), since the AF arithmetic process is finished, so that the AF motor 140 is being driven, based on the defocus value, control is returned to step S323. If the AF motor driving bit is "0" at step S341, since the AF motor 140 is inoperative, control proceeds to step S342.

At step S342, whether the integration is being performed is checked; that is, whether the integral bit is "1" is checked. If the integral bit is "0" (no integration is performed), control proceeds to step S343 to perform the processes of steps S343 to S349. If the integral bit is "1", control proceeds to step S350.

At step S343, the bits d6 to d1 are set to "110000" to set a standard value of the monitor reference voltage Vref. At step S344, the integral amplifier gain of the CCD image sensors 20, 30 and 40 is set to be 11. At step S345, the integral timer which detects an excess integration time is set to be 200 mS and starts at step S346.

At step S347, the interruption by the output terminal $\overline{\Phi}_{TM}$ is made possible. At step 348, the integral bit is set to "1". At step S349, the output terminal $\overline{\Phi}_{START}$ is set to "0" ("L") to start the integration, so that the control is returned to the interruption loop.

If it is verified that the integration is being performed at step S342, control proceeds to step S350 to check whether the integral timer is over due. If it is not overdue control is returned to step S341, so that the processes mentioned above are repeated until the integration is completed.

If the integral timer is overdue, the control proceeds to step S351, at which the interruption by the output terminal $\overline{\Phi}_{TM}$ is made possible. At step S352, the integration completion flags F3, F2 and F1, which represent that the integration of the CCD image sensors 40, 30 and 20 is finished, namely, that the integral values of the monitor output terminals M1, M2 and M3 become the monitor reference voltage Vref are set to "0".

At step S353, the amplifier gain of the CCD image sensors 20, 30 and 40 are set to be a standard value "1". After that, control proceeds to step S354.

At steps S354 to S369, the stages (three stages) of the monitor reference voltage Vref to which the integral values of the monitor output terminals M1, M2 and M3 amount are successively judged, so that the gain of the differential amplifier 118 is set for each of the CCD image sensors 20, 30 and 40.

In summary, the gains of the amplification of the integral values of the CCD image sensors 20, 30 and 40 (measuring zones) are set to make it possible to perform the necessary brightness measuring arithmetic process when the integral values of the monitor outputs M1, M2 and M3 do not reach the monitor reference voltage Vref.

The gain setting process will be explained below.

At step S354, whether the integration completion flag F1 of the second image sensor 20 is "1" is checked. If the flag F1 is "0", control proceeds to step S355 and if the flag F1 is "1", control jumps to step S358. Since the first detection shows "0", control proceeds to step S355 to judge whether or not terminal $\Phi_{T1M}$ is "L"; that is, whether the integral value of the second monitor input portion 22 reaches the monitor reference voltage Vref.

If the terminal $\Phi_{T1M}$ is "L", the control jumps to step S358. However, if terminal $\Phi_{T1M}$ is "H", control proceeds to S356. At step S356, the gain of the second CCD image sensor 20 is set to "1". After that, the integration completion flag F1 is set at step S357, and control proceeds to step S358.

At step S358, whether the integration completion flag F2 of the first CCD image sensor 30 is set to "1" is judged. If the flag F2 is "0", control proceeds to step S359. If the flag F2 is "1", control jumps to step S362. Since the first detection detects "0", control proceeds to step S359 to check whether terminal $\Phi_{T2M}$ is "L"; that is, whether the integral value of the first monitor input portion 32 reaches the monitor reference voltage Vref.

If the terminal $\Phi_{T2M}$ is "L", control jumps to step S362. However, if terminal $\Phi_{T2M}$ is "H", the control proceeds to S360. At step S360, the amplification gain of the first circumferential CCD image sensor 30 is set to "1". After that, the integration completion flag F2 is set at step S361, and control proceeds to step S362.

At step 360, the gain of the first CCD image sensor 30 is set to "1". After that, the integration completion flag F2 is set, and control proceeds to step S362.

At step S362, the integration completion flag F3 of the third CCD image sensor 40 is checked to see if it is set to "1". If the flag F3 is "0", control proceeds to step S363. If the flag F3 is "1", control jumps to step S366. Since the first detection detects "0", control proceeds to step S363 to check whether the terminal $\Phi_{T3M}$ is "L"; that is, whether the integral value of the third monitor input portion 42 reaches the monitor reference voltage Vref.

If terminal $\Phi_{T3M}$ is "L", control jumps to step S366. On the contrary, if terminal $\Phi_{T3M}$ is "H", control proceeds to S364. At step S364, the amplification gain of the second circumferential CCD image sensor 40 is set to "1". After that, the integration completion flag F3 is set at step S365, and control proceeds to step S366.

At step S366, G is checked to see if it is equal to 3, that is, whether the processes of steps S354 to S366 have been repeated three times is checked. If the processes of steps S354 to S366 have been not repeated three times, control proceeds to step S367 to shift the bits d6 to d1 rightward by one bit, so that the output voltage of the 6-bit D/A converter 121 becomes half, i.e. about 1.2 V, whereby the monitor reference voltage Vref becomes half. After that, at step S368, 1 is added to G and the processing returns step S354.

Namely, in the first process of steps S354 to S366, the monitor reference voltage Vref in about 2.4 V of the output voltage of the 6-bit D/A converter 121. However, in the second and third processes of steps S354 to S366, the monitor reference voltage Vref is about ½ and ¼, respectively. Consequently, three stages (steps) of gain of amplification, depending on the quantity of light incident upon the CCD image sensors 20, 30 and 40 can be obtained.

At step S366, if G is equal to 3 (G=3), control proceeds to step S369. Since three processes of steps S354 to S366 have been already performed, the output terminal $\Phi_{STOP}$ is turned to "H" to forcedly stop the integration of the CCD image sensors 20, 30 and 40. Processing then returns to the main routine.

According to the monitor sub-routine mentioned above, when a predetermined integration time i.e, (200 mS in the illustrated embodiment) of the monitor light receiving portions 22, 32 and 42 and the CCD image sensors 20, 30 and 40 are performed and when the integral values of the monitor light receiving portions 22, 32 and 42 are the monitor reference voltage Vref within a predetermined period of time, the integration is stopped via hardware. Even if the integral values of the monitor light receiving portions 22, 32 and 42 does not reach the monitor reference voltage Vref within the predetermined period of time, the integration is stopped via software, after the lapse of the predetermined time, at step S369.

After the lapse of the predetermined time, and before the stop of the integration, the integral values of the monitor light receiving portions 22, 32 and 42 are checked in three steps (stages) of levels. Depending on the levels, the integral value amplification levels can be determined. Namely, if the integral value is small, the integral value is amplified with a gain of two times or four times the standard gain. Accordingly, even if all or part of the objects in the measuring zone are dark, data for sufficient measuring arithmetic inputs can be obtained.

The integration of the CCD image sensors and the transfer of the electric charges will be explained below with reference to FIGS. 23A and 23B.

Figure 23A:
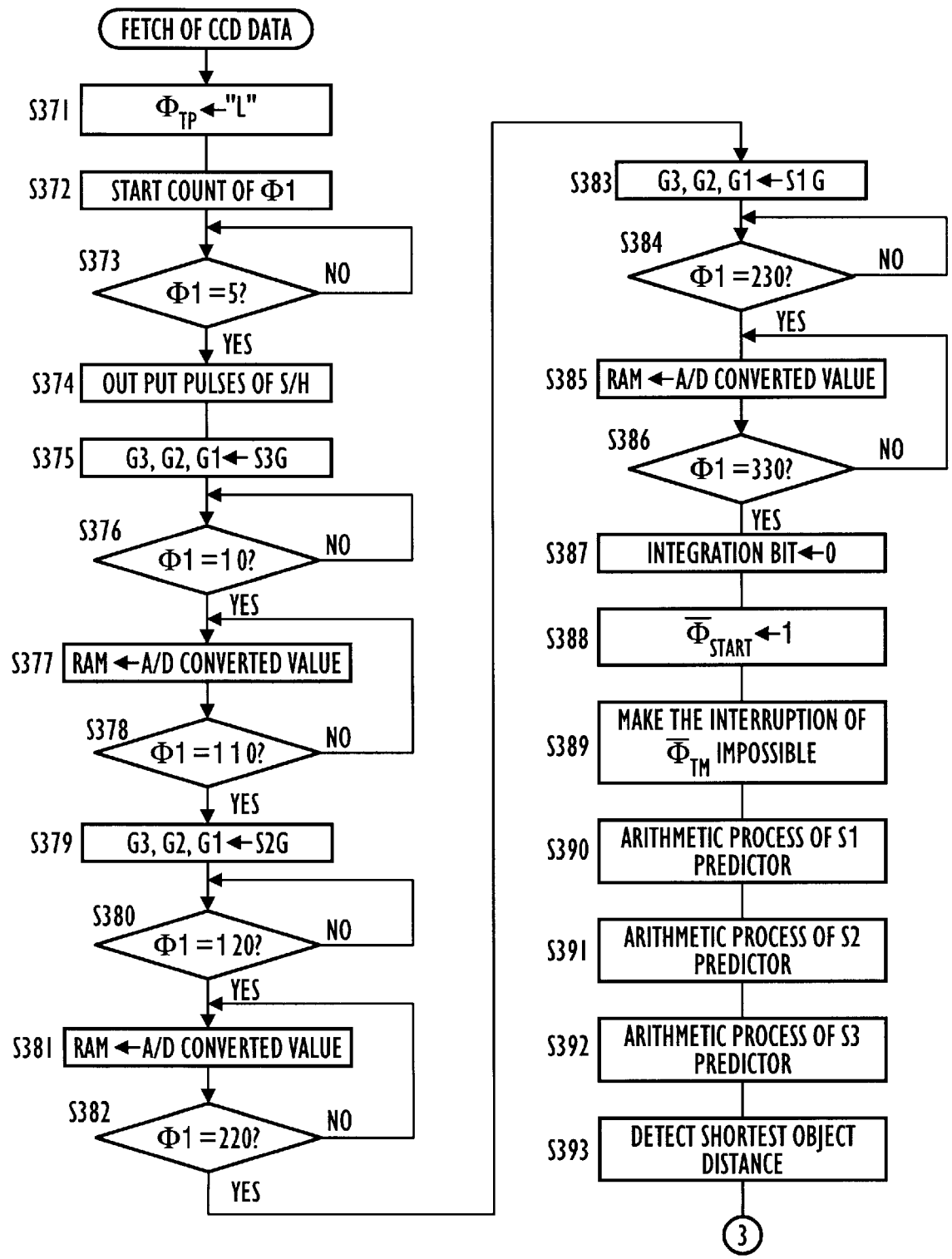
FIG. 23A and 23B are flow charts of fetching process of data of the CCD image sensor.
Figure 23B:
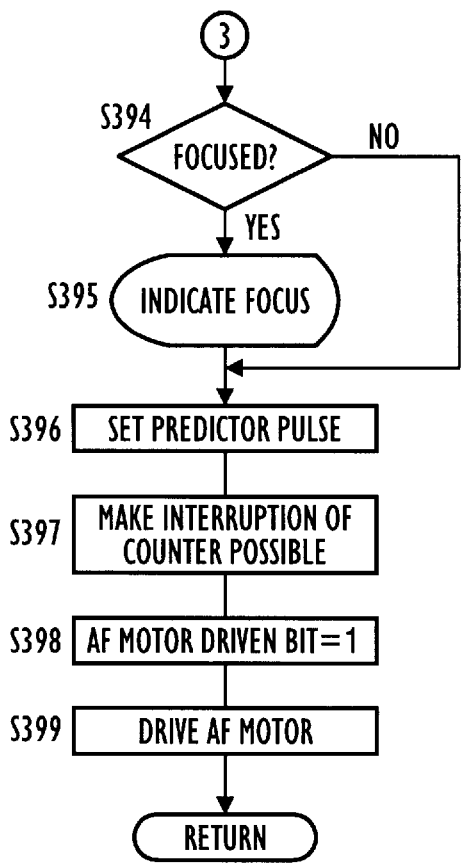
Figure 24:
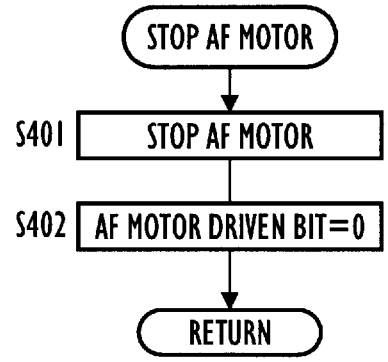

The flow chart shown in FIGS. 23A and 23B is interrupted under the condition that the input terminal $\overline{\Phi}_{TM}$ is "L". Input terminal $\overline{\Phi}_{TM}$ is "H" at the start of the integration and during integration, and becomes "L" at the stop of the integration. When the input terminal $\overline{\Phi}_{TM}$ is "L", gates $\Phi_{T1}$ to $\Phi_{T3}$ change like "L"→"H"→"L", so that the electric charges accumulated in the vicinity of gate ST are transferred to the vicinity of gate $\Phi_T$ (FIG. 12 (C) and (D)).

At step S371, output terminal $\overline{\Phi}_{TP}$ is turned to "L", so that control proceeds to step S372. When output terminal $\overline{\Phi}_{TP}$ is "L", gate $\Phi_T$ is turned to "H", as soon as the clock terminals $\Phi_{16}$ and $\Phi_{64}$ are "H" and the clock gate $\Phi32$ is "L", so that the electric charges accumulated in the vicinity of the gates $\Phi_{T1}$, $\Phi_{T2}$ and $\Phi_{T3}$ are transferred to the CCD transfer portion 51 (FIG. 12(E) and (F)). The electric charges accumulated in the CCD transfer portion 51 are transferred to the CCD output portion 52 by gates $\Phi_1$ and $\Phi_2$, to which the two-phase clock pulses are applied.

At steps S372 to S386, the number of pulses of gate $\Phi_1$ at the CCD output portion 52 is counted to detect the light receiving element of the light receiving portion having the integral value corresponding to the video signal issued from the CCD output portion 52. In the illustrated embodiment, the output of the intercepted photoelectric converting element 41a corresponds to the fifth pulse, and the output of the light receiving portions 40, 30 and 20 correspond to any one of the 10 to 109th pulses, any one of the 120 to 219th pulses and any one of the 230 to 329th pulses, respectively.

At step S327, the number of pulses of gate $\Phi_1$ is counted. After that, at step S373, whether five pulses are produced at gate $\Phi_1$ is checked. The check is repeated until five pulses are produced.

When five pulses are detected, control proceeds to step S375 at which a S/H pulse is outputted to store (memorize) the video signal in the capacitor 82.

When the video signal is stored, control proceeds to step 375 in which the gain of the differential amplifier 118 is set to be the gain which has been set at step S364. After that, control proceeds to step S376.

At step S376, control does not proceed until the video signal is produced from the third image sensor 40, that is; until the number of pulses of gate $\Phi_1$ is 10.

When 10 pulses are counted, control proceeds to step S9377 in at which the video signal amplified by the differential amplifier 118 and converted into a digital signal by the A/D converter is stored in the RAM. This process is repeated until 119 pulses are counted, so that the video signals from the photoelectric elements of the third CCD image sensor 40 are successively stored in the RAM. Namely, 100 video signals (10th to 109th) are stored in the RAM.

When the 110th pulse is detected, control proceeds to step 379 at which the gain of the differential amplifier 118 is set to be equal to the gain which has been set at step S360. After that, at step S380, the number of pulses is counted until the 130th pulse is issued.

When the 120th pulse is detected, control proceeds to step S381, at which the video signal amplified by the differential amplifier 118 and converted into a digital signal by the A/D converter is stored in the RAM. This process is repeated until 219 pulses are counted, so that the video signals from the photoelectric elements of the first CCD image sensor 30 are successively stored in the RAM. Namely, 100 video signals (130th to 229th) are stored in the RAM.

When the 230th pulse is detected, control proceeds to step 383 at which the gain of the differential amplifier 118 is set to be equal to the gain which has been set at step S356. After that, at step S384, the number of pulses is counted until the 230th pulse is issued.

When the 230th pulse is detected, control proceeds to step S385, at which the video signal amplified by the differential amplifier 118 and converted into a digital signal by the A/D converter is stored in the RAM. This process is repeated until 329 pulses are counted, so that the video signals from the photoelectric elements of the second circumferential CCD image sensor 20 are successively stored in the RAM. Namely, 100 video signals (220th to 329th) are stored in the RAM.

Thus, the video signals issued from the photoelectric elements of the CCD image sensors 40, 30 and 20 are successively stored in the RAM.

When the storing operation is completed, control proceeds to step S387, at which the integral bit is reset to "0". After that, at step S388, output terminal $\overline{\Phi}_{START}$ is set to "1", and at step S389, an interruption by input terminal $\overline{\Phi}_{TM}$ is made impossible.

At steps S390, S391 and S392, the predictor arithmetic process (of a known correlation method) are performed for every video signal of the CCD image sensors 20, 30 and 40 stored in the RAM to detect the object distance and the defocus value for every CCD image sensors 20, 30 and 40. After that, at step S393, the measuring zones 12, 13 and 14 of the shortest object distance are detected, so that the focusing operation is performed for the objects of the measuring zones 12, 13 and 14.

At step S395, the focusing state is checked. If the lens (camera) is correctly focused, control proceeds to step S395 to indicate an in-focus state in the finder inside LCD 144. If the lens (camera) is not focused, control jumps to step S396.

At step S396, the pulses which define the number of revolutions of the AF motor 140, based on the result of the predictor arithmetic process is set. After that, interruption by the AF motor pulse counter is made possible at step S397. At step S398, the AF motor drive bit is set to "1" to drive the AF motor 140. After that, control is returns to the MAIN routine.

When the AF motor 140 rotates, the AF motor pulser 121 produces the pulses, so that the number of pulses is counted by the counter provided in the CPU 130.

When the number of pulses becomes equal to the value set at step S396, an AF motor stop routine is performed (step S401) to stop the AF motor 140. After that, at step S402, the AF motor drive bit is set "0". Processing then returns to the MAIN routine.

In the illustrated embodiment, the brightnesses of the objects in the three measuring zones are detected by the monitor light receiving portions to adjust the time of integration or the gain, and accordingly, even if there is a large difference in brightness between the measuring zones, a precise object distance can be detected for every measuring zone.

As mentioned above, according to the present invention, the object distances of the objects in all the measuring zones are detected, so that the focusing is effected for the object of the shortest object distance. Therefore, if the object to be taken is not located in the center of the finder filed of view, namely, for example, if spaced human figures are located in the right and left measuring zones, so that the background appears in the center filed of view, focusing is effected for the human figure having the shortest object distance in the right or left measuring zone. As a result, complicated and troublesome operations of the prior art, in which after the human figure is first positioned in the center measuring zone, a so-called focus lock is effected, and the camera is then moved to have a desired composition, are unnecessary in the present invention. According to the present invention, a desired composition can be easily and simply realized.

It is also possible to effect the focusing for an object of the longest object distance or an optional object distance (optional measuring zone) which is selected by a photographer.

As can be seen from the foregoing, according to the present invention, since the measuring zone is provided above the center of the finder field of view, upon taking a picture of a human figure, a face of the human figure is located in the measuring zone, so that the photographer's eyes substantially coincide with the face of the human figure.

Also, according to the present invention, photoelectric (converting) elements are arranged in the shape of an inverted U, so that no snake-like bend of the signal transfer members, as in the prior art, is necessary. This results in a decreased transfer distance of the signal charge, in the present invention.

Furthermore, according to the present invention, since the quantities of light incident upon the object distance measuring sensors for each of the measuring zones are detected, so that when the quantities of light of the monitor light receiving portions reach a predetermined value, integration of the associated object distance measuring sensor is stopped, and the time of integration time can be properly controlled for every measuring zone.

In addition, if the amplification gain of the signal charge of each measuring zone can be independently controlled, even if there is a measuring sensor in which the monitor value does not reach a predetermined value, a proper signal charge can be obtained for each of the measuring sensors by increasing the signal charge of that measuring sensor in which the monitor value does not reach a predetermined value to be larger than the output gain or gains of the other measuring sensor or sensors, thus resulting in a precise detection of the object distance for each measuring zone.

As can be understood from the above discussion, according to the present invention, since the object distance can be precisely detected for each of the measuring sensors, regardless of the brightness of the objects in the measuring zones, the apparatus of the present invention can be advantageously applied to an AF device in which the object distance of each of the measuring zones is detected to focus the lens at an optimum depth of field.

Furthermore, in the self-scanning image sensor according to the present invention, since the electric charges are temporarily held by the charge holding portion provided between the integral portion and the charge transfer portion, the integral operation can be stopped regardless of the state of the charge transfer portion, and accordingly, for example, precise object distance data, particularly for high brightness object, can be obtained. Furthermore, the stop of the integral operation can be controlled by a simple control circuit.

We claim:

1. A focus detecting apparatus of a camera, comprising a plurality of image sensors that are arranged in a generally inverted U-shape and which are positioned in a single plane, said plurality of image sensors having a common transfer gate that is arranged in a shape that complements said generally inverted U-shape arrangement of said plurality of image sensors, an offset center object distance measuring zone of one of said plurality of image sensors being located above a center portion of a finder field of view, said offset center object distance measuring zone being located at a place in said finder field of view where a photographer most frequently looks at when said photographer observes an object through said finder field of view; an automatic focusing optical system for converging a luminous flux of said object to be photographed in said object distance measuring zone; and an object distance measuring sensor on which said luminous flux of said object is converged by said automatic focusing optical system.

2. A focus detecting apparatus, comprising a plurality of image sensors that are arranged in a generally inverted U-shape and which are positioned in a single plane, said plurality of image sensors having a common transfer gate that is arranged in a shape that complements said generally inverted U-shape arrangement of said plurality of image sensors, a first object distance measuring zone of one of said plurality of image sensors being offset above a center portion of a finder field of view, at a place where a photographer most frequently looks at when said photographer observes an object through said finder field of view; second and third object distance measuring zones that are located on opposite sides of said center portion of the finder field of view; first, second and third automatic focusing optical systems for converging luminous fluxes of said object to be photographed in said first, second and third object distance measuring zones; and, first, second and third object distance measuring sensors on which said luminous fluxes of said objects in said first, second and third object distance measuring zones are converged by said associated first, second and third automatic focusing optical systems.

3. A focus detecting apparatus, comprising:

a first object distance measuring sensor having an object distance measuring zone that is located above a center portion of a finder field of view;

second and third object distance measuring sensors having respective object distance measuring zones that are located on opposite sides of said center portion of the finder field of view; and first, second and third automatic focusing optical systems for converging luminous fluxes of objects to be photographed in said first, second and third object distance measuring zones, said luminous fluxes of said objects in said first, second and third object distance measuring zones being converged by said associated first, second and third automatic focusing optical systems, wherein said first, second and third object distance measuring sensors are arranged to have a generally inverted U-shape that is positioned in a single plane, said first, second and third object distance measuring sensors having a common transfer gate that is arranged in a shape that complements said generally inverted U-shape arrangement of said first, second and third object distance measuring sensors.

4. A focus detecting apparatus according to claim 3, wherein each of said first, second and third object distance measuring sensors has a light receiving portion having a number of photoelectric converting elements, an integral portion which integrates the signal charges obtained by the photoelectric elements, a charge holding portion which temporarily holds the signal charges integrated by the integral portion, and a signal charge transferring portion which outputs in turn the signal charges held by the charge holding portion.

5. A focus detecting apparatus according to claim 4, wherein said photoelectric converting elements, said charge holding portion and said charge transferring portion are formed on a single integrated circuit board.

6. A focus detecting apparatus, comprising a plurality of object distance measuring sensors, each sensor having a respective object distance measuring zone, said plurality of object distance measuring sensors being arranged in a generally inverted U-shape and which are positioned in a single plane, wherein one of said plurality of object distance measuring zones is offset above a center portion of a finder field of view at a place in said finder field of view where a photographer most frequently looks at when said photographer observes an object in said finder field of view, luminous fluxes of said object to be photographed by associated object distance measuring zones being converged by said plurality of object distance measuring sensors; and, an object distance measuring arithmetic means for integrating outputs of said plurality of object distance measuring sensors to detect an object distance of said object in each of said respective object distance measuring zones, in accordance with integral values of said integrating means, wherein each of said plurality of object distance measuring sensors comprises a photoelectric convertor array having a number of photoelectric converting elements; a monitor light receiving portion which is located in a vicinity of said photoelectric convertor array to detect a quantity of light that falls incident upon said photoelectric convertor array; an integral portion which integrates a signal charge obtained by said photoelectric converting elements; a charge holding portion which temporarily holds said signal charges integrated by said integral portion; a common signal charge transferring portion which outputs said signal charges held by said charge holding portions, said common signal charge transferring portion being shaped to compliment said generally inverted U-shape of said plurality of object distance measuring sensors; and, a control means for transferring said signal charges integrated by said integral portions into said charge holding portions when the quantity of light received by said monitor light receiving portion amounts to a predetermined value, or when a predetermined integration time lapses, and transferring all of said signal charges held by said charge holding portion into said common signal charge transferring portion after a completion of said transferring of signal charges from said charge integral portion to said charge holding portion.

7. A focus detecting apparatus according to claim 6, wherein said control means transfers said signal charge integrated in said integrated portion to said charge holding portion when the quantity of light by respective monitor light receiving portions first amount to a predetermined value prior to a lapse of a predetermined integration time or when a predetermined integration time lapses before the quantity of light by said respective monitor light receiving portions amount to a predetermined value.

8. A focus detecting apparatus according to claim 6, wherein said object distance measuring zones comprise a first object distance measuring zone located above the center portion of the finder field of view, and second and third object distance measuring zones located on the opposite sides of the center portion of the finder field of view.

9. A focus detecting apparatus according to claim 6, wherein amplification gains of the outputs of the object distance measuring sensors are independently variable.

10. A focus detecting apparatus according to claim 6, wherein each of the object distance measuring sensors has a plurality of monitor light receiving portions.

11. A focus detecting apparatus according to claim 6, wherein each of said object distance measuring sensors has a separate integration time controller for starting and stopping the integration of the associated object distance measuring sensors.

12. A focus detecting apparatus according to claim 6, wherein said light receiving portion, said monitor light receiving portion, said charge holding portion and said charge transferring portion are formed on a single integrated circuit board.

13. A focus detecting apparatus, having a first object distance measuring sensor that has an object distance measuring zone that is located above a center portion of said finder field of view, and second and third object distance measuring sensors that have respective object distance measuring zones that are located on opposite sides of said center portion of said finder field of view, luminous fluxes of objects to be photographed by associated object distance measuring zones being converged on said first, second and third object distance measuring sensors, and means for integrating outputs of said first, second and third object distance measuring sensors to detect an object distance of said object in each of said object distance measuring zones, in accordance with integral values of said integrating means, wherein each of said first, second and third object distance measuring sensors comprise:

a photoelectric convertor array having a number of photoelectric converting elements;

a monitor light receiving portion which is located in a vicinity of said photoelectric convertor array to detect a quantity of light that falls incident upon said photoelectric convertor array;

an integral portion which integrates a signal charge obtained by said photoelectric converting elements;

a charge holding portion which temporarily holds said signal charges integrated by said integral portion;

a signal charge transferring portion which outputs said signal charges held by said charge holding portions; and control means for transferring said signal charges integrated by said integral portions into said charge holding portions when the quantity of light received by said monitor light receiving portion amounts to a predetermined value, or when a predetermined integration time lapses, and transferring all of said signal charges held by said charge holding portion into said charge transferring portion after a completion of said transferring of signal charges from said charge integral portion to said charge holding portion, wherein each of said first, second and third object distance measuring sensors corresponding to said first, second and third object distance measuring zones are generally U-shaped and positioned in a single plane, and said signal charge transferring portion comprises a signal charge transferring portion that is common to said first, second and third object distance measuring sensors and which is shaped to compliment said generally inverted U-shape of said first, second and third object distance measuring sensors.

14. A self-scanning image sensor, comprising:

a light receiving array of photoelectric converting elements;

an integration portion that integrates signal charges obtained by said photoelectric converting elements, said integration portion including an integration control gate that regulates said integration portion;

a charge holding portion separate from said integration portion, said charge holding portion temporarily confining and holding said signal charges integrated by said integration portion in a potential well while said integration portion is substantially cleared of said signal charges, and said charge holding portion including a charge holding gate that transfers said signal charges from said integration portion to said potential well after a predetermined transfer time;

and a shift gate that controls the transfer of said signal charges from said potential well to a transfer portion separate from said charge holding portion and said integration portion.

15. A self-scanning image sensor according to claim 14, wherein said light receiving array has a monitor sensor which measures a quantity of light incident upon said photoelectric converting elements and which is located in the vicinity of said photoelectric converting elements.

16. A self-scanning image sensor according to claim 14, wherein said light receiving array, said integration portion, said separate charge holding portion and said separate charge holding gate are formed on a single integrated circuit board.

17. A focus detecting apparatus, comprising an object distance measuring sensor on which luminous fluxes of objects to be photographed in an associated object distance measuring zone are converged; and
an object distance measuring arithmetic system for integrating an output of said object distance measuring sensor to detect an object distance of an object in said object distance measuring zone, wherein said object distance measuring sensor comprises:
a photoelectric convertor array having a number of photoelectric converting elements;
a monitor light receiving portion which is located in a vicinity of said photoelectric convertor array to detect a quantity of light that falls incident upon said photoelectric convertor array;
an integration portion which integrates signal charges obtained by said photoelectric converting elements;
a charge holding portion separate from said integration portion which temporarily confines and holds said signal charges integrated by said integration portion in a potential well while said integration portion is substantially cleared of said signal charges until a predetermined transfer time occurs;
a signal charge transferring portion separate from both said charge holding portion and said integration portion, which outputs said signal charges held by said charge holding portion; and
a control system for transferring said signal charges integrated by said integration portion into said charge holding portion when the quantity of light received by said monitor light receiving portion amounts to a predetermined value, or when said predetermined transfer time occurs, and transferring all of said signal charges held by said charge holding portion into said charge transferring portion after a completion of said transferring of signal charges from said integration portion to said charge holding portion.

18. A focus detecting apparatus according to claim 17, wherein said photoelectric converting elements, said integration portion, said charge holding portion and said charge transferring portion are formed on a single integrated circuit board.

19. An image sensor, comprising:
a light receiving sensor array that obtains signal charges;
an integration portion that integrates said signal charges;
a transfer register having an output controlled by signal levels at a transfer gate; and
a charge holding portion, separate from said integration portion and said transfer register, that serves to isolate said integration portion from said signal levels at said transfer gate by holding said signal charges while said integration portion is substantially cleared of said signal charges and transferring said signal charges to said transfer register at a predetermined transfer time.

20. A self-scanning image sensor, comprising:
a light receiving array of photoelectric converting elements;
an integration control gate that regulates the accumulation of signal charges from said light receiving array in a first potential well;
a charge holding gate that confines and holds accumulated signal charges in said first potential well and controls the transfer of said accumulated signal charges from said first potential well to a second potential well separate from said first potential well;
a transfer register separate from said first potential well and said second potential well; and
a shift gate that controls the transfer of said accumulated signal charges from said second potential well to the transfer register, said charge holding gate confining and holding said accumulated signal charges in said second potential well while said first potential well is substantially cleared of said signal charges before said shift gate permits the transfer of said accumulated signal charges from said second potential well to the transfer register.

21. A self scanning image sensor, comprising:
a light receiving portion having a plurality of photoelectric converting elements;
an integration portion that integrates signal charges obtained by said photoelectric converting elements in a first potential well;
a transfer register controlled by a transfer gate; and
a charge holding portion separate from said integration portion and said transfer register, said charge holding portion transferring said signal charges from said integration portion to a second potential well, then temporarily confining and holding said signal charges in said second potential well while said first potential well is substantially cleared of said signal charges until a predetermined transfer time, and then transferring said signal charges from said second potential well to a transfer register, said charge holding portion serving to isolate said integration portion from signal levels at said transfer gate.

22. An image sensor, comprising:
a light receiving sensor unit including a plurality of sensor arrays, each of said plurality of sensor arrays obtaining corresponding signal charges;
integration portions corresponding to each of said plurality of sensor arrays, said integration portions integrating said corresponding signal charges;
a transfer register; and
charge holding portions corresponding to each of said plurality of sensor arrays and separate from said integration portions and said transfer register, each of said charge holding portions transferring said corresponding signal charges from a corresponding integration portion at an independent predetermined time, and confining said signal charges while said integration portion is substantially cleared of said signal charges until a predetermined transfer time,
wherein said charge holding portions transfer said signal charges to said transfer register at said predetermined transfer time.

23. The image sensor according to claim 22, further comprising:
monitor light receiving portions corresponding to each of said plurality of sensor arrays, each said monitor light receiving portion detecting a quantity of light incident to a respective one of said plurality of sensor arrays, wherein
each of said charge holding portions transfers said corresponding signal charges from a corresponding integration portion when a corresponding monitor light receiving portion reaches a reference voltage.

* * * * *